US006904056B2

(12) United States Patent
Merani et al.

(10) Patent No.: US 6,904,056 B2
(45) Date of Patent: Jun. 7, 2005

(54) METHOD AND APPARATUS FOR IMPROVED SCHEDULING TECHNIQUE

(75) Inventors: Lalit Merani, Santa Clara, CA (US); Umesh Kulkarni, New Thippasandra (IN); Venu Madhav, Malleswaram (IN)

(73) Assignee: Nokia, Inc., Irving, TX (US)

( * ) Notice: Subject to any disclaimer, the term of this patent is extended or adjusted under 35 U.S.C. 154(b) by 359 days.

(21) Appl. No.: 09/823,786

(22) Filed: Mar. 30, 2001

(65) Prior Publication Data

US 2002/0141416 A1 Oct. 3, 2002

(51) Int. Cl.⁷ .............................. H04J 3/16; H04J 3/22; H04L 12/56
(52) U.S. Cl. ........................ 370/468; 370/543; 370/907
(58) Field of Search .................. 370/542–543, 370/468, 907, 230, 230.1, 232, 235, 384, 408, 465, 391, 358, 395.4–395.43, 412

(56) References Cited

U.S. PATENT DOCUMENTS

| | | | |
|---|---|---|---|
| 5,144,624 A | * 9/1992 | Sharper et al. ............. 370/384 |
| 5,463,620 A | 10/1995 | Sriram |
| 5,765,097 A | * 6/1998 | Dail ........................... 725/125 |
| 5,794,073 A | 8/1998 | Ramakrishnan et al. |
| 5,831,980 A | 11/1998 | Varma et al. |
| 5,841,772 A | 11/1998 | Daniel et al. |
| 5,959,658 A | * 9/1999 | Gnauck et al. .............. 725/151 |
| 5,999,518 A | 12/1999 | Nattkemper et al. |
| 6,377,583 B1 | 4/2002 | Lyles et al. |
| 6,389,031 B1 | 5/2002 | Chao et al. |
| 6,477,144 B1 | * 11/2002 | Morris et al. ............. 370/230.1 |
| 6,538,869 B1 | * 3/2003 | Lee et al. .................... 361/115 |
| 6,618,381 B1 | * 9/2003 | Miyamoto et al. ..... 370/395.43 |
| 6,654,376 B1 | * 11/2003 | Stacey et al. .......... 370/395.21 |
| 2002/0144260 A1 | * 10/2002 | Devara ........................ 725/32 |

OTHER PUBLICATIONS

Newton, Newton's Telecom Dictionary, Oct. 1998, Telecom Books, p. 534–535.*
PCT Notification of Transmittal of The International Search Report or The Declaration for PCT Counterpart Application No. PCT/US02/09843 Containing International Search Report (Oct. 17, 2002).
Patent Cooperation Treaty International Preliminary Examination Report for Counterpart International Application No. PCT/US02/09843, dated Oct. 6, 2003, 5 pgs.

* cited by examiner

Primary Examiner—Chi Pham
Assistant Examiner—Ronald Abelson
(74) Attorney, Agent, or Firm—Squire, Sanders & Dempsey L.L.P.

(57) ABSTRACT

An apparatus that includes a node having a scheduling cycle. The scheduling cycle is partitioned into amounts of data such that one of the partitioned amounts of data serviced per scheduling cycle corresponds to a data rate that corresponds to a highest speed grade managed by the node.

44 Claims, 11 Drawing Sheets

US 6,904,056 B2

METHOD AND APPARATUS FOR IMPROVED SCHEDULING TECHNIQUE

FIELD OF INVENTION

The field of invention relates to networking, generally; and, more specifically, to an improved scheduling technique and an improved port queuing technique.

BACKGROUND

User Granularity

FIG. 1a shows a network 100 having an access node 101a. An access node 101a acts as an reception point for traffic being sent into the network 100 and a transmission point for traffic being sent from the network 100. Typically those that are sending/receiving traffic into/from the network may be referred to as "users" of the network.

A wide range of different users may exist. That is, some users may send/receive large amounts of traffic to/from the network 100 while other users may send/receive small amounts of traffic to/from the network 100. For example, the access node 101a may be asked to provide access for the traffic from/to a large industrial campus while simultaneously providing access for the traffic from/to a single person within his or her own home.

FIG. 1a attempts to show a wide range of different users being serviced by access node 101a. Note that, as an example, access node 101a has four OC-12 network lines 102a, 104a, 115a, 117a. Each OC-12 network line corresponds to a 622 Mb/s line. The traffic carried by these network lines 102a, 104a, 115a, 117a may be reduced to varying degrees of granularity depending on the users the access node 101a is configured to provide access for.

For example, in the exemplary deployment of FIG. 1a, network line 117a corresponds to traffic being delivered to a single user. As such, the user coupled to network line 117a consumes 622 Mb/s worth of traffic. By contrast, note that network line 102a provides service for three hundred and thirty six different users. That is, multiplexer 103 reduces the 622 Mb/s network line 102a into three hundred and thirty six individual DS1 lines $106_1$ through $106_{336}$ that each provide 1.544 Mb/s worth of service to a different user.

Network lines 115a, 104a are reduced into degrees of granularity that fall between the degrees that network lines 117a and 102a are resolved. That is, multiplexer 116 reduces network line 115a into four individual OC-3 lines that each provide 155.52 Mb/s worth of service to a different user. Multiplexers 105, 108, 110, 112,113, 114 together reduce network line 104a into: 1) two OC-3 lines $107_1$, $107_2$ that provide 155.52 Mb/s worth of service to two different users; 2) three DS3 lines $109_1$, $109_2$, $109_3$ that provide 44.736 Mb/s worth of service to three different users; and 3) eighty four DS1 lines $111_1$ through $111_{84}$ that provide 1.544 Mb/s worth of service to eighty four different users.

Thus, noting the wide range of granularity that may exist per network line: network line 117a has one user, network line 115a has four users, network line 104a has eighty nine users, and network line 102a has three hundred and thirty six users. Access node 101a is responsible for controlling information flow to/from each user on an independent basis (e.g., for proper billing, etc.). Thus, access node 101a is responsible for "keeping track of" individual users over a wide spectrum of granularities.

Network System Models

Various approaches may be used to model the functional layers that exist within a system that implements a node within a network such as access node 101a. FIG. 1b shows one such model for a networking system 101b. Packets are sent over network lines 102b, 104b, 115b, 117b and 120b (which, as an example, may be viewed as corresponding to network lines 102a, 104a, 115a, 117a and 120a of FIG. 1a).

As discussed, network lines 102b, 104b, 115b, 117b and 120b correspond to the physical wiring (such as copper cables or fiber optic cables) that emanate from the system 101b. Network lines 102b, 104b, 115b, 117b and 120b are used to physically carry input traffic (i.e., traffic entering system 101b) and output traffic (i.e., traffic leaving system 101b) from/to other networking systems.

Line aggregation layer 190 is used to aggregate the input traffic from network lines 102b, 104b, 115b, 117b, and 120b and segregate the output traffic to network lines 102b, 104b, 115b, 117b, and 120b. An input channel (e.g., input channel 191a) is used to carry aggregated input traffic from one or more network lines. For example, input channel 191a may be used to carry the input traffic only from network line 120b. Thus each input channel 191a,b,c is a logical structure that carries the traffic arriving to system 101b from the channel's corresponding network lines.

The number of network lines that correspond to a particular input channel may vary depending upon the design and/or configuration of a particular system 101b. Also, one or more input channels (e.g., input channels 191a,b,c) may exist, depending on the design point of a particular system. In an analogous fashion, line aggregation layer 190 is also used to segregate all the output traffic to network lines 102b, 104b, 115b, 117b, and 120b. As such each output channel 192a,b,c is a logical structure that carries the traffic leaving system 101b along the logical channels corresponding network lines.

Packet aggregation layer 180 is used to form input packets from the input traffic on input channels 191a,b,c and effectively send output packets over the output traffic existing on output channels 192a,b,c. Various packet forms may be implemented at packet aggregation layer 180. For example, for ATM related network lines 102b, 104b, 115b, 117b, and 120b, AAL0 and AAL5 packet types may be recognized at packet aggregation layer 180. Similarly, packets associated with the Point to Point Protocol, HDLC, Frame Relay and Ethernet may be used, as is known in the art, among others not listed above as well.

As an example of the operation of the packet aggregation layer 180, assume that network lines 102b, 104b, 115b, 117b, and 120b are ATM network lines carrying AAL5 packets with ATM cells. ATM cells correspond to the traffic on network lines 102b, 104b, 115b, 117b, and 120b and input/output channels 191a–c, 192a–c. Packet aggregation layer 180 forms AAL5 input packets in the input direction (i.e., cell reassembly) and breaks down AAL5 output packets in the output direction (i.e., cell segmentation).

Within networking/transport layer 160b, as shown in FIG. 1, an input packet is converted into an output packet. Input packets are presented to the networking/transport layer 160b by the packet aggregation layer 180 and output packets are presented to the packet aggregation layer 180 by the networking/transport Layer 160b. Networking/transport layer 160b may be responsible for: 1) effectively identifying the networking node that an input packet should be transmitted over when it leaves the system 101b as an output packet; and 2) treating the input packet consistently with a service level agreement (SLA), or other service outline, applicable to that packet. For example, if a particular user agrees to a particular rate and quality of service (QoS) for his packets, networking/transport layer 160b checks to see if the user's packet is within the user's allotted rate and, if so, also prioritizes the packet within system 101b consistent with the user agreement.

EXAMPLE OF A NETWORKING/TRANSPORT LAYER

FIG. 1c shows an embodiment of a networking transport layer 160c that may be used for the networking/transport layer 160b of FIG. 1b. Referring to FIG. 1c, networking transport layer 160c has a packet processing pipeline 130, output packet organizer 140 and a packet buffer 150 (which may also be referred to as packet buffer memory 150, buffer memory 150 and the like).

In the case of packets that are sent from the service provider to a user (e.g., from network line 120a of FIG. 1a to any of the users that access node 101a serves), networking transport layer 160c regulates the output rate associated with packets being sent from the service provider's network to a particular user. This may also be referred to as output rate regulation.

That is, packets arriving from the service provider's network (e.g., from network line 120a of FIG. 1a) are stored into packet buffer 150 (via input 170c) from the packet aggregation layer. The packet aggregation layer also forwards to the pipeline 130a packet identifier that acts as reference (e.g., a memory pointer) to the packet being stored in the packet buffer memory 150. Associated with the packet identifier is information that describes various characteristics of the packet (e.g., its destination address, its size, an indicator of its priority, etc.).

The operation of pipeline 130 and output packet organizer 140 affects when the packet will be removed from packet buffer memory 150 to the packet aggregation layer (along output 171c). In various packet processing pipeline 130 embodiments applied to the scenario of FIG. 1c, packet processing pipeline 130: 1) identifies which user the packet is to be sent to; and 2) understands the output rate and priority applicable to the packet in order to release it from the networking/transport layer 160c at a time that is appropriate for the particular user; and 3) enters the packet identifier into the output packet organizer 140.

Toward the output of pipeline 130, the placement of a packet identifier into a specific location within the output packet organizer 140 affects when the packet will be released from packet buffer 150. That is, output packet organizer 140 has locations that correspond or otherwise correlate to the time at which a packet is released from packet buffer 150. When a packet identifier within output packet organizer 140 is processed, the release of the associated packet from the packet buffer 150 is triggered. This triggering is represented by trigger line 172. Trigger line 172 may be any address line, control line or other logic used to release a packet from packet buffer 150.

BRIEF DESCRIPTION OF THE DRAWINGS

The present invention is illustrated by way of example, and not limitation, in the Figures of the accompanying drawings in which.

DETAILED DESCRIPTION

Figure 1A:
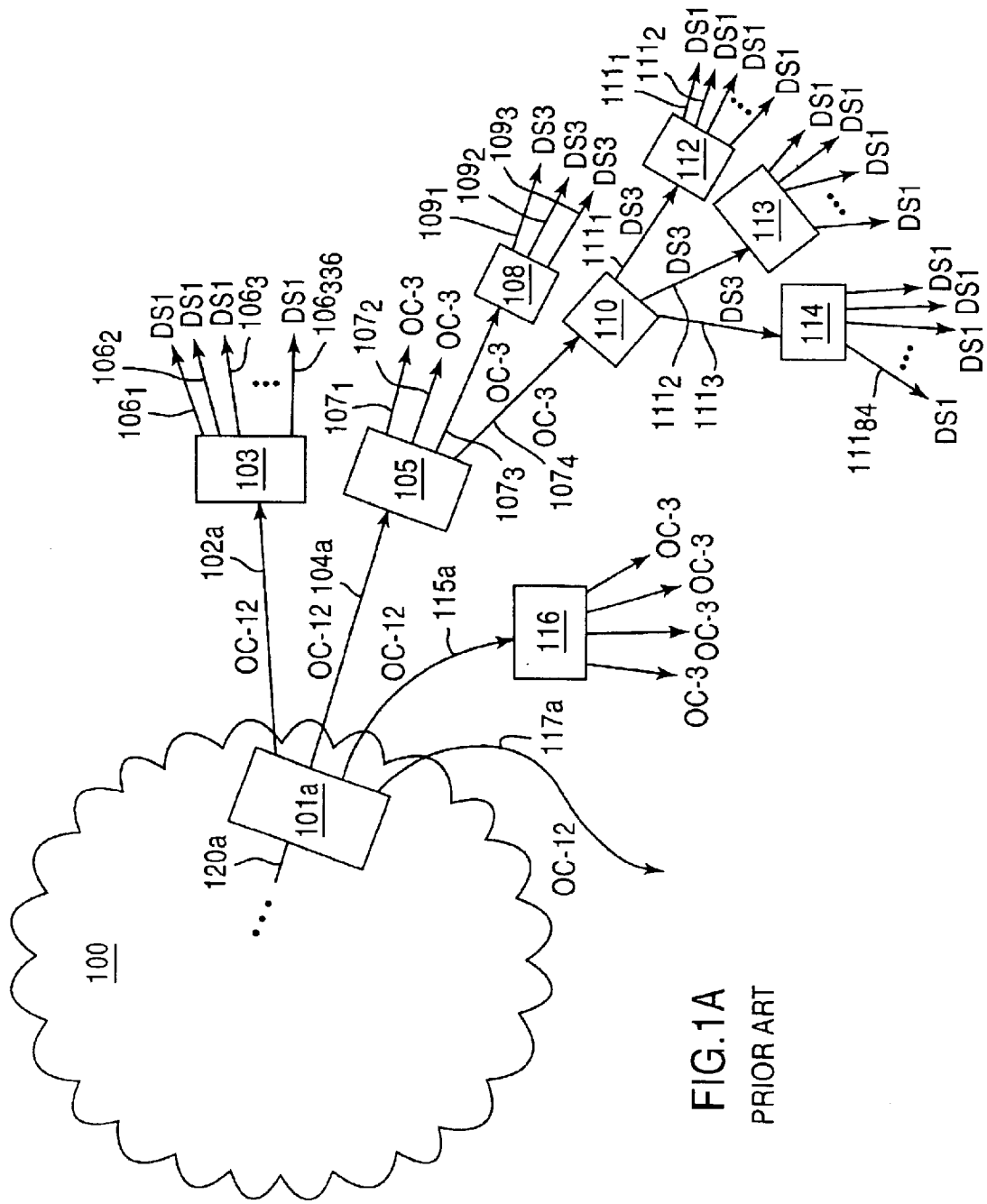
FIG. 1a shows an example of an access node servicing different users.
Figure 1B:
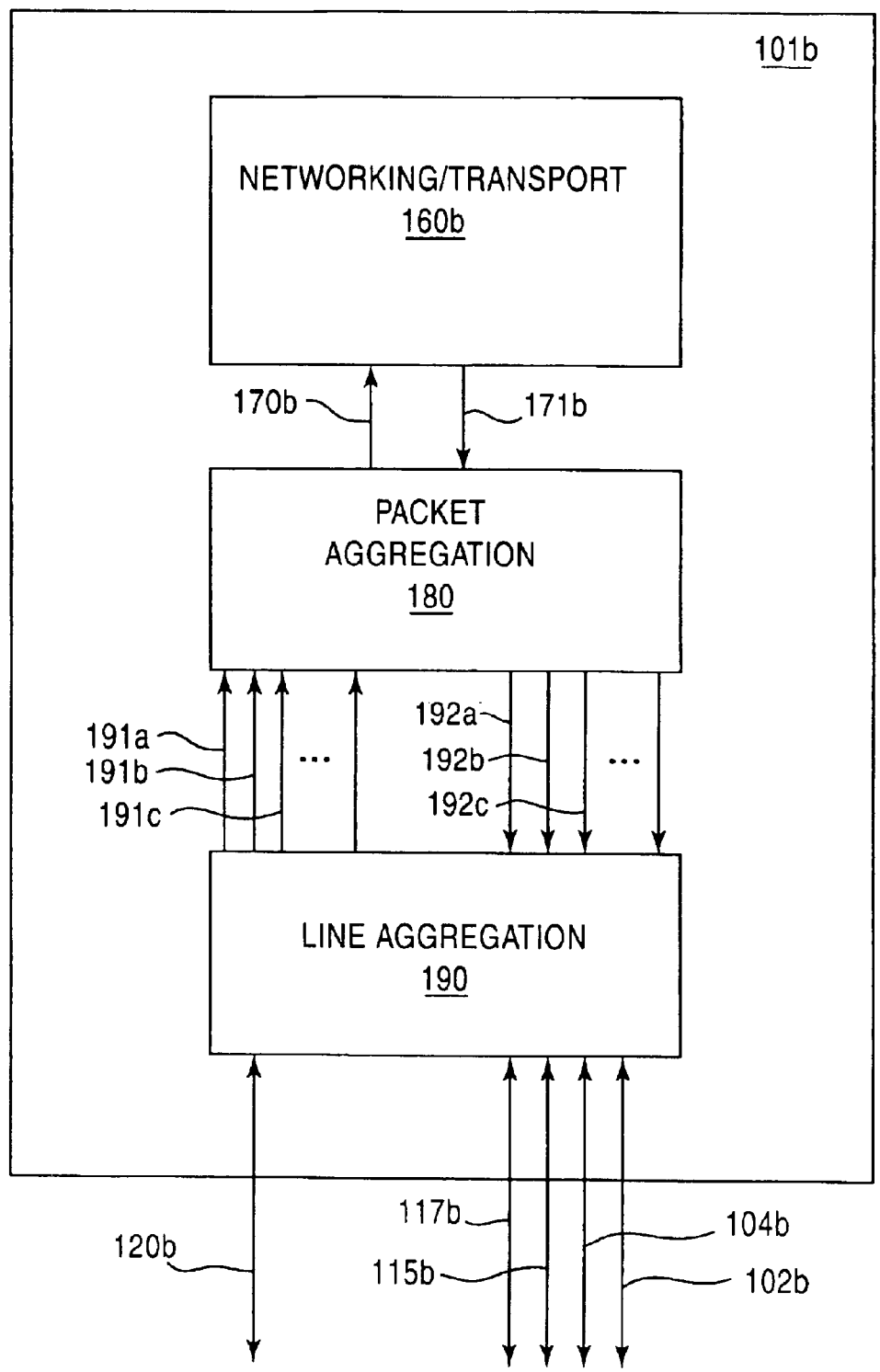
FIG. 1b shows a model of a networking system.
Figure 2:
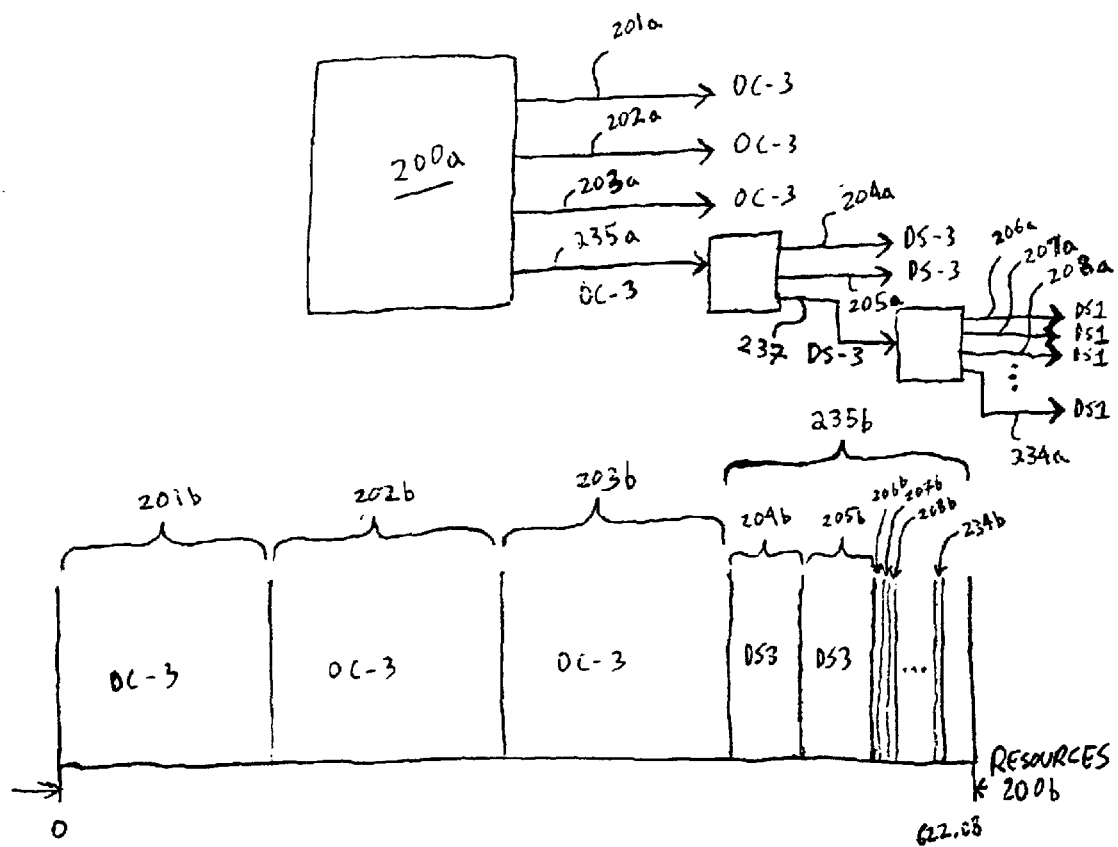
FIG. 2 shows that the resources of an access node may be viewed as partitioned with respect to the users that are serviced by the access node.

FIG. 2 shows an exemplary access node 200a having: 1) three OC-3 users (that respectively use network lines 201a through 203a); 2) two DS3 users (that respectively use DS3 lines 204a and 205a); and 3) twenty-eight DS1 users (that respectively use DS1 lines 206a through 234a). Note that for simplicity, the access node 200a of FIG. 2 supports a less complex mixture of users as compared to the access node 101a of FIG. 1a.

Note that because the access node has four OC-3 network lines 201a through 203a and 235a, the access node 200a may be viewed as having switching or routing resources (which may also be referred to as "resources" or "capacity" or "bandwidth") 200b sufficient to handle approximately 622.08 Mb/s worth of traffic (i.e., 4×155.52 Mb/s per OC-3 network line 622.08 Mb/s). FIG. 2 shows these resources 200b partitioned according to a ranking of "speed grades" associated with the users that its serves.

A speed grade is an amount of bandwidth provided to a user. For example, with respect to the particular example of FIG. 2, note that the highest speed grade associated with the user of network line 201a is 155.52 Mb/s. According to the perspective of FIG. 2, the resources 200b of the access node 200a are partitioned according to the highest speed grade supported by the node. Because the highest speed grade supported by the node is 155.52 Mb/s and because the node has 622.08 Mb/s worth of resources, there are four partitions 201b, 202b, 203b, and 235b (i.e., 622.08/155.52=4.0).

The speed grades supported by the access node are also ranked from highest to lowest (e.g., from left to right as seen in FIG. 2). Thus, the first three resource partitions 201b, 202b, 203b correspond to the three OC-3 rate users. Users receiving service at less than the highest speed grade service (e.g., the DS3 and DS1 users of FIG. 2) may be viewed as being "handled" within the highest speed grade partition 235b that is not associated with a highest speed grade user. Thus, resources devoted to the DS3 users 204b, 205b and the DS1 users 206b through 234b are shown within the fourth highest speed grade partition 235b.

Scheduling Technique

Figure 3:
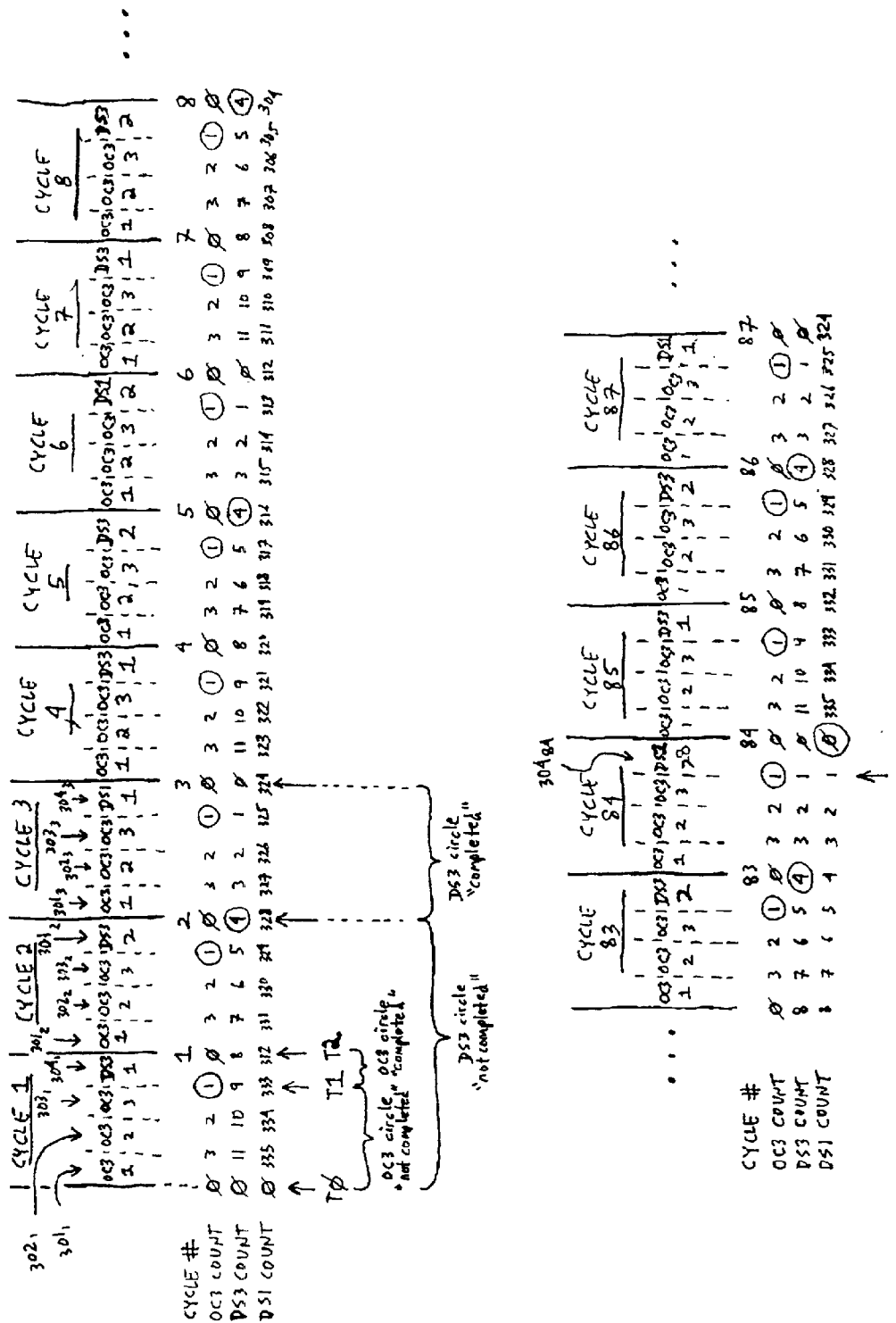
FIG. 3 shows a scheduling technique that may be used to properly schedule packets over a wide spectrum of user granularity.

FIG. 3 shows a scheduling technique that partitions each scheduling cycle according to the highest speed grade managed by the node. Scheduling is a process that organizes the forwarding of one or more packets within a node toward a particular user. For example, referring to FIG. 1c, scheduling corresponds to the timing in which trigger line 172 authorizes the release of one or more packets destined for a particular user from the packet buffer memory 150 onto output 171c.

For simplicity, the scheduling example provided in FIG. 3 corresponds to the scheduling performed by access node 200a of FIG. 2 under maximum load conditions. According to the scheduling technique discussed herein, a node's switching or routing capacity (e.g., its bandwidth "B" as defined, for example, in terms of Mb/s or Gb/s) is viewed as being partitioned according to the highest speed grade managed by the node.

The switching or routing performed by a node may be viewed as a cyclical operation. FIG. 3 shows a number of such cycles (e.g., "cycle 1", "cycle 2", "cycle 3", "cycle 4", "cycle 5", etc.). A highest speed grade counting modulo, $x_1$, may be given by:

$$x_1 = \text{min integer } [B/X] \qquad \text{Eqn. 1}$$

where B is the switching or routing capacity of the node and X is the highest speed grade managed by the node. The "min integer" operation effectively equates $x_1$ to the maximum number of highest speed grade users that could be fully serviced by the node. As such, as described in more detail below, each scheduling cycle is partitioned into regions that are coextensive with the highest speed grade managed by the node; and, each scheduling cycle is coextensive with $x_1$ such partitions.

For example, with respect to the example of FIGS. 2 and 3, the highest speed grade counter corresponds to the "OC3 Count" seen in FIG. 3. Here, the highest speed grade "X" managed by the node 200a of FIG. 2 corresponds to an OC-3 rate (155.52 Mb/s) and the routing or switching capacity "B" of the node 200a corresponds to 622.08 Mb/s. As a result, the highest speed grade counting modulo is 4.0 (from equation 1). Thus, as seen in FIG. 3, each scheduling cycle has four partitions (e.g., cycle 1 has partitions $301_1$, $302_1$, $303_1$, $304_1$; cycle 2 has partitions $301_2$, $302_2$, $303_2$, $304_2$; etc.,). A partition that is coextensive with the highest speed grade is a partition whose amount of data is such that one partition per scheduling cycle corresponds to a data rate that is equal to the highest speed grade managed by the node. For simplicity, except where noted, the phrase "a partition" or "a partition worth of data" is meant to refer to a "a partition worth of data that is coextensive with the highest speed grade."

Partitioning each scheduling cycle according to the highest speed grade managed by the node allows for (as described in more detail below) straightforward bandwidth allocation not only to those users that receive information at the highest speed grade rate, but also those users that receive information at less than the highest speed grade rate (i.e., lower speed grade users). Furthermore, scheduling may be easily conformed to any network configuration and may also be implemented in a programmable fashion. The combination of these features allows for a low cost node that can be easily adapted in the field to schedule traffic for a wide variety of different users and their corresponding speed grades.

A user, regardless of speed grade, is serviced by forwarding a partition worth of data for the user. Each partition, as discussed above, is coextensive with the highest speed grade managed by the node. For the highest speed grade users, as developed in more detail below, this corresponds to each highest speed grade user being serviced during each scheduling cycle. However, because a lower speed grade user consumes less bandwidth than the highest speed grade user, a lower speed grade user does not require servicing across each scheduling cycle.

As a result, one or more scheduling cycles will occur between consecutive partitions dedicated to the same lower speed grade user. The slower of the lower speed grades have more scheduling cycles between their dedicated partitions than the faster of the lower speed grades. That is, because a partition worth of data is able to "last longer" in serving a slower lower speed grade user (e.g., a DS1 user in FIG. 2), partitions may be spaced farther apart from one another over the course of time. Similarly, because a partition worth of data does not last as long in serving a faster lower speed grade user (e.g., a DS3 user in FIG. 2), partitions are spaced closer together in time.

The partition modulo for servicing a particular lower speed grade user, $x_n$, may be calculated according to:

$$x_n = kx_{n-1} \qquad \text{Eqn. 2}$$

where: 1) k corresponds to the number of lower speed grade users that can be serviced by the next highest speed grade (from which the lower speed grade service is derived); and 2) $x_{n-1}$ corresponds to the partition modulo of the next highest speed grade (from which the lower speed grade service is derived).

For example, referring to the example of FIG. 2, note that a pair of DS3 users (as coupled to DS3 lines 204a, 205a) are serviced from an OC-3 line 235a. Referring to Equation 2, note that the DS3 users correspond to the lower speed grade users for whom the partition modulo is to be determined. That is, $x_n$ corresponds to the partition modulo of the DS3 users, $x_{n-1}$ corresponds to the partition modulo for the OC-3 speed on line 235a that services the DS3 users, and k is the number of DS3 users that can be serviced from an OC-3 line.

In this case, $x_{n-1}$ corresponds to the partition modulo of the highest speed grade (OC-3) as discussed above. That is, $x_{n-1}$=4.0. Furthermore, as a DS3 service corresponds to a 44.736 Mbps service, three DS3 users (3×44.736 Mbps= 134.205 Mbps) can be serviced by an OC3 service (which has a capacity of 155.52 Mbps). That is, k=3.0. From Equation 2 then, the partition modulo $x_n$ of the DS3 users is 12.0=3.0×4.0.

Thus, the pair of DS3 users will be serviced properly if they are each provided a partition worth of data for every 12.0 partitions (i.e., once every three scheduling cycles as there are 4.0 partitions per scheduling cycle). Note that a partition modulo of 12.0 for the pair of DS3 users has been mapped into the exemplary scheduling pattern of FIG. 3. That is, as seen in FIG. 3, a first of the pair of DS3 users ("DS3_1") is serviced in the $1^{st}$, $4^{th}$, $7^{th}$, . . . , etc. scheduling cycles while the second of the pair of DS3 users ("DS3_2") is serviced in the $2^{nd}$, $5^{th}$, $8^{th}$, . . . , etc. scheduling cycles.

As another example, referring back to FIG. 2, consider the 28 DS1 users that are each respectively associated with lines 206a through 234a. Note that these DS1 lines are sourced by a third DS3 line 237 that, in turn, is fed by OC-3 line 235a. As such, referring to Equation 2, the DS1 users correspond to the lower speed grade users for whom the partition modulo is to be determined; and, the DS3 service associated with line 237 is the next highest speed grade from which the DS1 users' service is derived.

The partition modulo for the DS3 service, $x_{n-1}$, corresponds to 12.0 as discussed just above. The number of DS1 users that can be serviced by a DS3 service, k, corresponds to 28.0 (as 28 DS1 channels are typically carried by a DS3 service). As such, from Equation 2, the partition modulo for the DS1 users ($x_n$) is 336.0=28.0×12.0. Note that a partition modulo of 336.0 has been mapped into the exemplary scheduling pattern of FIG. 3. This corresponds to a partition worth of data being provided to a particular DS1 user every 84 scheduling cycles. Thus, as seen in FIG. 3, a first of the DS1 users ("DS1_1") is serviced in the $3^{rd}$, $87^{th}$, etc. scheduling cycles.

Implementation of Scheduling Technique a. Overview

Figure 1C:
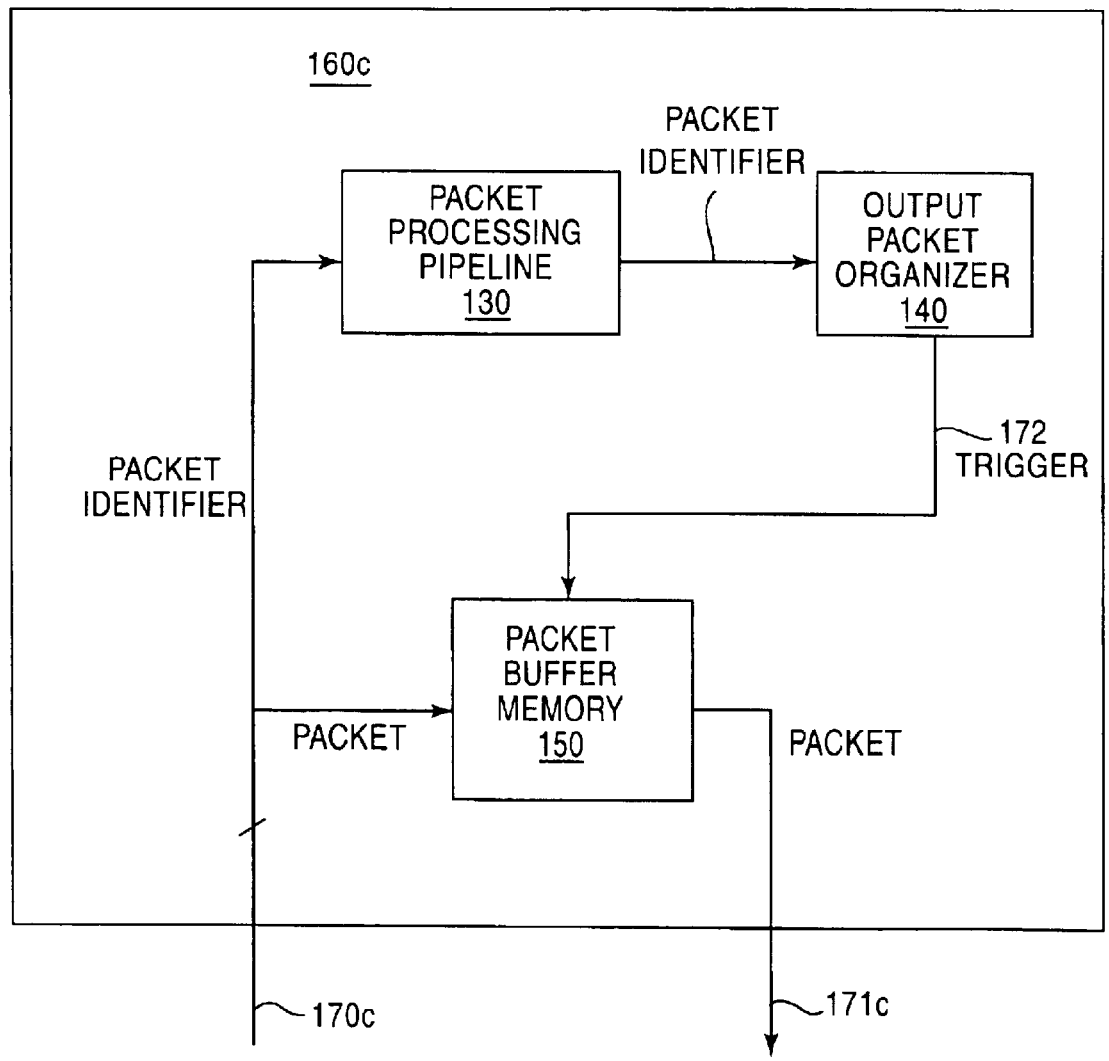
FIG. 1c shows an example of a networking/transport layer.

Recall the networking/transport layer architecture originally shown in FIG. 1c. Referring to FIG. 1c, the operation of the pipeline 130 and the output packet organizer 140 affects when a packet will be removed from the packet buffer memory 150 (so as to be forwarded to the packet aggregation layer along output 171c). In an embodiment where the scheduling technique discussed above is implemented upon a node architecture that corresponds to FIG. 1c, the servicing of a partition corresponds to a partition worth of data being removed from the packet buffer 150 along output 171c.

The release of a partition of data is triggered by the signaling along trigger line 172. The substantive content of the signaling indicates which data is to be removed from the packet buffer memory 150. For example, a plurality of memory read addresses may be used to read a series of packets from the packet buffer memory 150 (e.g., where the series of packets correspond to a partition worth of data for a particular user) to effectively service a user as described above with respect to the scheduling technique of FIG. 3.

The placement of a packet identifier (that is issued from the pipeline 130) into a specific location within the output packet organizer 140 affects when the packet identifier's corresponding packet will be released from the packet buffer memory 150. That is, output packet organizer 140 has locations that correspond or otherwise correlate to the time at which a packet is released from the packet buffer 150. When a packet identifier within the output packet organizer 140 is processed, the release of the associated packet from the packet buffer memory 150 is triggered.

For ease of conception, the discussion of the scheduling technique of FIG. 3 described each scheduling cycle partition as servicing a particular "user" that communicates with a node. It is important to point out that dedicating each scheduling partition on a "per user" basis is just one embodiment for implementing the scheduling technique discussed above. For example, more generally, each scheduling partition may service a "port" within a node. The various "locations" within the output packet organizer 140 (referred to above) correspond to different ports implemented within the node.

In an embodiment, a port may be viewed as a location that: 1) collects packet identifiers for packets having one or more common characteristics (such as a common header parameter and/or other label that characterizes the packet); and 2) has an allocated amount of bandwidth. The ports having the most amount of bandwidth are referred to as the highest speed grade ports, while ports receiving less than this maximum amount are referred to as lower speed grade ports.

Consistent with this, as a broader alternative embodiment, the word "port" may replace the word "user" in the description provided above in FIG. 3. For example, the amount of bandwidth assigned to a port corresponds to the variable X provided in equation 1 (for a highest speed grade port). As such, the node may be viewed as servicing various speed grade ports that have been configured within the node; and, the scheduling cycle may be viewed as being divided into partitions that are coextensive with the highest speed grade port.

Recall that a port may not only be assigned a bandwidth but may also collect packet identifiers for packets that have at least one common characteristic (such as a common header parameter or other label that characterizes the packet). As a result, a variety of ports may be implemented within a node so that packets having one or more common characteristics are treated in like fashion (as caused by the manner in which their particular port is constructed and/or serviced).

For example, one way of implementing the particular approach described above in FIG. 3 (where partitions worth of data are provided to each "user") is to configure each port to collect packet indentifiers for a particular user. As such, packet identifiers may be placed into ports based upon packet header information that is indicative of the packet's destination (e.g., the IP destination address of the user, the TCP Port ID of the user, a combination of both, etc.). By also configuring the bandwidth allocated to each port to be commensurate with the bandwidth consumed by each user (e.g., a 155.52 Mb/s port bandwidth for an OC3 user), the servicing of each port corresponds to the servicing of each user as described above in FIG. 3.

In other nodal configurations, ports may be configured to collect packet identifiers based upon header information that is indicative of a packet's traffic class or priority (e.g., such as the TOS value within an IP header). In other cases, packet identifiers may be placed into ports based upon a label assigned to the packet by the node (e.g., such as a connection identifier used to keep track of the various connections supported by a service provider's network). In summary, by segregating the flow of packet identifiers into different ports based upon one or more common characteristics shared by their respective packets, the node may be configured in a number of different ways to orchestrate its treatment of different types of packets.

Figure 4:
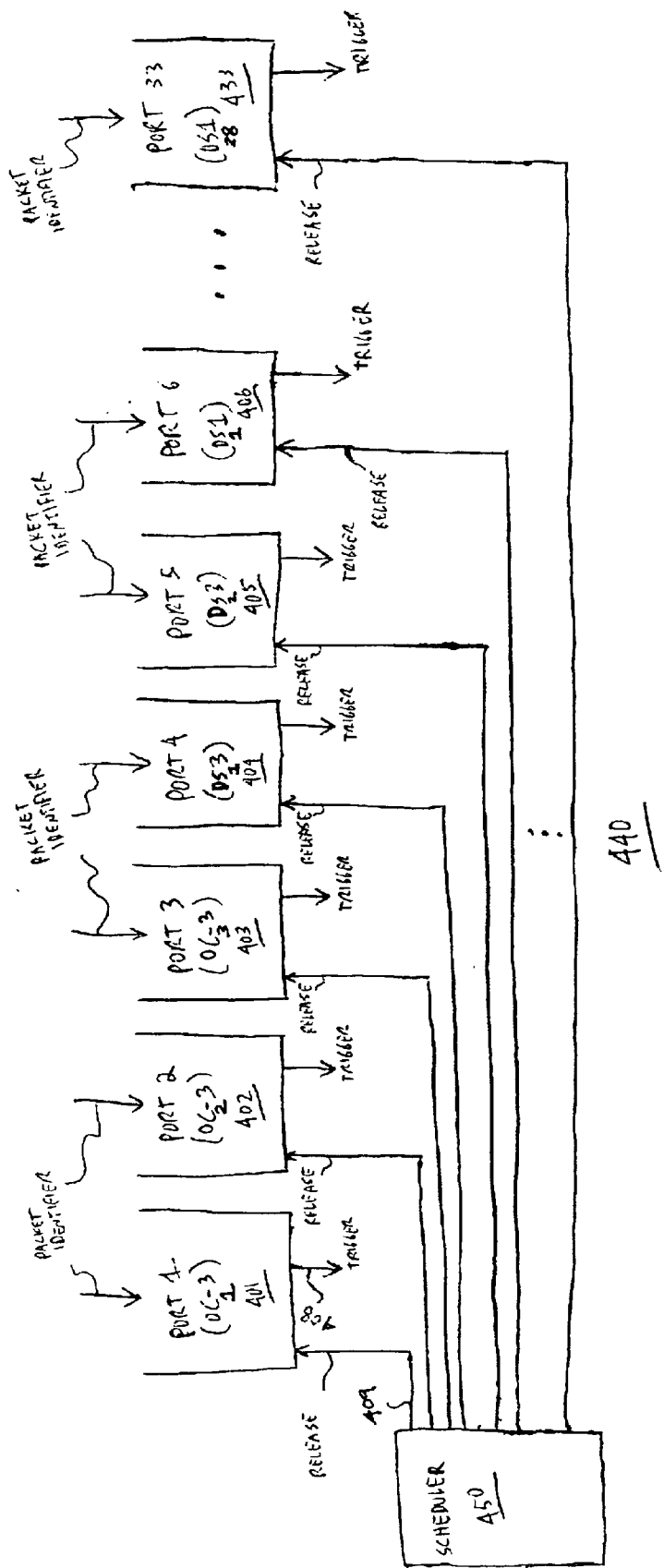
FIG. 4 shows an embodiment of an output packet organizer that may be used in implementing the scheduling technique of FIG. 3.

FIG. 4 shows an embodiment of an output packet organizer 440 having a plurality of ports 401 through 433. The particular embodiment of FIG. 4 corresponds to the example mentioned just above where each port 401 through 433 corresponds to a different user. Thus each port receives packet identifiers for packets that are destined for a particular user. For further simplicity, the particular embodiment of FIG. 4 corresponds to the exemplary node 200a of FIG. 2 and the scheduling example discussed in FIG. 3.

The highest speed grade ports correspond to three ports 401, 402, 403 that are each provided 155.52 Mb/s of bandwidth. Packet identifiers for packets destined for the first OC3 user (OC3_1) are entered into port 401; packet identifiers for packets destined for the second OC3 user (OC3_2) are entered into port 402; and packet identifiers for packets destined for the third OC3 user (OC3_3) are entered into port 403.

The lower speed grade ports correspond to: 1) two ports 404, 405 that are each provided 44.736 Mb/s of bandwidth to properly control the flow of information to the pair of DS3 users (DS3_1, DS3_2); and 2) twenty eight ports 406 through 433 that are each provided 1.544 Mb/s worth of bandwidth so as to properly control the flow of information to the twenty eight DS1 users (DS1_1 through DS1_28). Packet identifiers for packets destined for a particular lower speed grade user are entered into the user's corresponding port.

Packet identifiers identify where their corresponding packet may be found in buffer memory (e.g., a memory read address that points to the memory location where the packet is found). Thus, by releasing a stream of packet identifiers from a port (e.g., along its corresponding trigger line), a corresponding stream of packets are removed from the packet buffer memory. The stream of packet identifiers are used, after their release from their port, to remove their corresponding packets from the packet buffer memory (e.g., a series of read addresses are collected and a memory read is performed for each read address).

Scheduler 450 authorizes ports to release a stream of packet identifiers and; as such, controls the timing associated with servicing of the ports. Each authorization from the scheduler 450 (which is presented to a port upon its release line as seen in FIG. 4) authorizes a partition worth of data that is coextensive with a highest speed grade partition to be removed from a port. Each port may be told how much a partition worth of data is (e.g., in terms of how bytes, kilobytes, megabytes, etc.). For example, the scheduler 450 may inform a port upon each authorization or the partition size may be stored as a configuration parameter within the port itself. Upon authorization by the scheduler 450, a port releases a sequence of packet identifiers whose corresponding collection of packets consume an amount of data within the packet buffer memory that is coextensive with a partition worth of data.

In an embodiment, each packet identifier has a "size" parameter that indicates how much data a packet consumes. As such, a port may effectively release a partition worth of data by adding together the packet sizes over all packet identifiers to be released (per authorization), and limiting the released stream of packet identifiers to an amount that corresponds to the partition size. Recalling that each port has an associated bandwidth, note that the frequency at which the scheduler 450 authorizes a particular port to release a partition worth of data corresponds to the bandwidth allocated to the port. In an embodiment, each port has a trigger output that corresponds to trigger 171 of FIG. 1c.

Figure 5A:
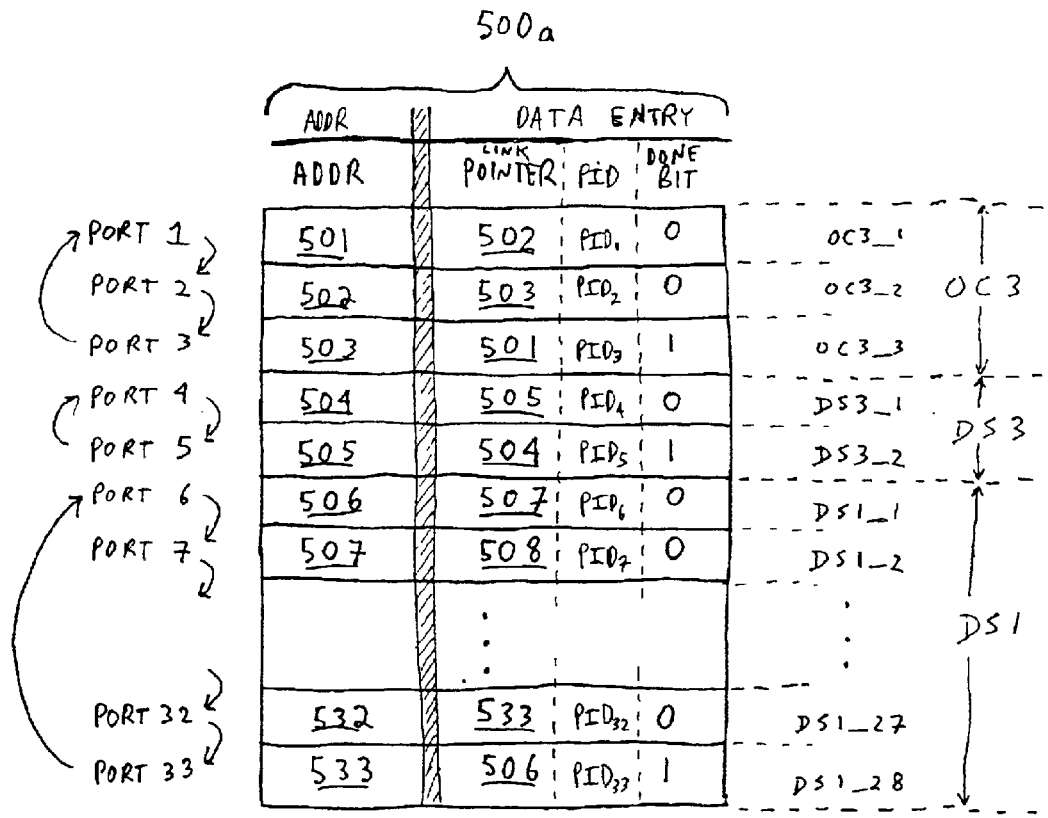
FIG. 5a shows a circular, per speed grade link list memory structure that may be used to implement the scheduling technique of FIG. 3.
Figure 5B:
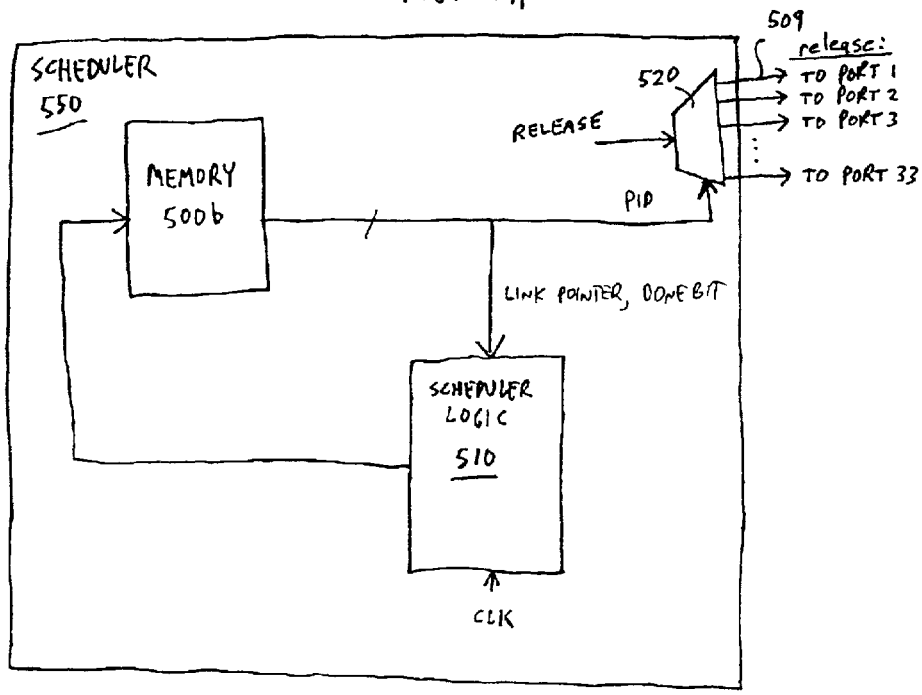
FIG. 5b shows an embodiment of a scheduler that may be used to implement the scheduling technique of FIG. 3.

Before moving on to FIGS. 5a and 5b, it is important to note that networking architectures other than the particular networking architecture of FIG. 1c may be used to implement the scheduling technique discussed herein. For example, rather than a pipeline, a routing machine (e.g., a processor that executes networking/transport layer software) may be used to forward packet identifiers into their appropriate port. In alternate embodiments, application specific logic designed to perform the routing or switching function may be used in place of the pipeline 130 of FIG. 3.

b. Circular, Per Speed Grade Servicing

Together, FIGS. 5a and 5b relate to an embodiment 550 of a scheduler that may be used for the scheduler 450 of FIG. 4. FIG. 5a shows a memory structure 500a that may be used for the memory structure 500b of FIG. 5b. The particular exemplary embodiment of FIG. 5a applies to the nodal configuration discussed so far with respect to FIGS. 2, 3, and 4. That is, the memory structure 500a of FIG. 5a applies to an 622 Mb/s capacity node having three OC3 users/ports (i.e., users OC3_1, OC3_2, and OC3_3 which are respectively handled through ports 1, 2 and 3); two DS3 users/ports (i.e., users DS3_1, DS3_2 which are respectively handled through ports 4 and 5); and twenty eight DS1 users/ports (i.e., users DS1_1, DS1_2, DS1_28 which are respectively handled through ports 6 through 33).

The memory structure 500a of FIG. 5a includes a data entry for each address where a port and its corresponding user are associated with each data entry. For example the first OC3 user, OC3_1, is represented within the memory 500a,b at address 501. In the embodiment of FIG. 5a, associated with each data entry is: 1) a link pointer to the next user/port associated with a circular, per speed grade link list; 2) a port identification (PID) data structure that is used to authorize the release of a partition worth of data from the port that is represented by the data entry (e.g., port 1/user OC3_1 for address 501); and 3) a "done bit" which signifies that the end of a circular speed grade link list has been reached. A discussion of each of these parameters as well as an example of scheduling operation immediately follows.

Note that the memory structure 500a of FIG. 5a is organized according to circular, per speed grade link lists. That is, the highest speed grade (OC3) has its own associated circular link list; the next highest speed grade (DS3) has its own associated circular link list; and the next highest speed grade (DS1) has its own associated circular link list. A link list is a chain of data entries that are logically strung together by including, within a first data entry, a link pointer that effectively points to a second, next data entry in the chain.

For example, as seen in FIG. 5a, the data entry for port 1 (which is found at address 501) includes a link pointer having the address 502 for the data entry of the second OC3 user (OC3_2) at port 2. Thus, the data entries at addresses 501 and 502 correspond to neighboring links in a link list. Furthermore, note that the data entry for port 2 (at address 502) has a pointer to the data entry for port 3 (at address 503) and that the data entry for port 3 (at address 503) has pointer that points back to the data address for port 1 (at address 501). The link list is therefore circular as the link points back upon itself. That is, by following the links in the link list, a circular pattern results.

Note also that the circular link list described above effectively links all the ports associated with the same, highest (OC-3) speed grade. Furthermore, note that a second circular link list is also formed within memory structure 500a that effectively includes all the ports associated with the next highest speed grade DS3 (i.e., the second circular link list includes the DS3_1 and DS3_2 ports that are represented at addresses 504 and 505, respectively). A third circular link list is also formed within memory structure 500a that effectively includes all the ports associated with next highest speed grade (i.e., the third circular link list includes users DS1_1 through DS1_28 at ports 6 though 33, respectively).

As such, a circular link list exists for each speed grade managed by the system. Such an arrangement may also be referred to as a collection of circular, per speed grade link lists. The circular per speed grade link list arrangement within the memory structure 500a of FIG. 5a effectively controls the circular servicing of each of the users within a particular speed grade. As described in more detail below, the reading of a data entry from the memory 500a,b triggers the release of a partition worth of data from the port that the data entry corresponds to.

A servicing circle for a particular speed grade corresponds to one complete "run through" of the circular link list within the memory 500a, 500b. For example, in the exemplary configuration and scheduling of FIGS. 2 and 3: 1) the circular link list for the OC3 users is run through once for every scheduling cycle (i.e., the data entries at addresses 501, 502, 503 are each read from once per scheduling cycle); 2) the circular link list for the DS3 users is run through once for every three scheduling cycles (i.e., the data entries at address 504 and 505 are each read from once per three scheduling cycles); and 3) the circular link list for the DS1 users is run through once for every 84 scheduling cycles (i.e., the data entries at addresses 506 through 533 are each read from once per eighty four scheduling cycles).

Figure 6:
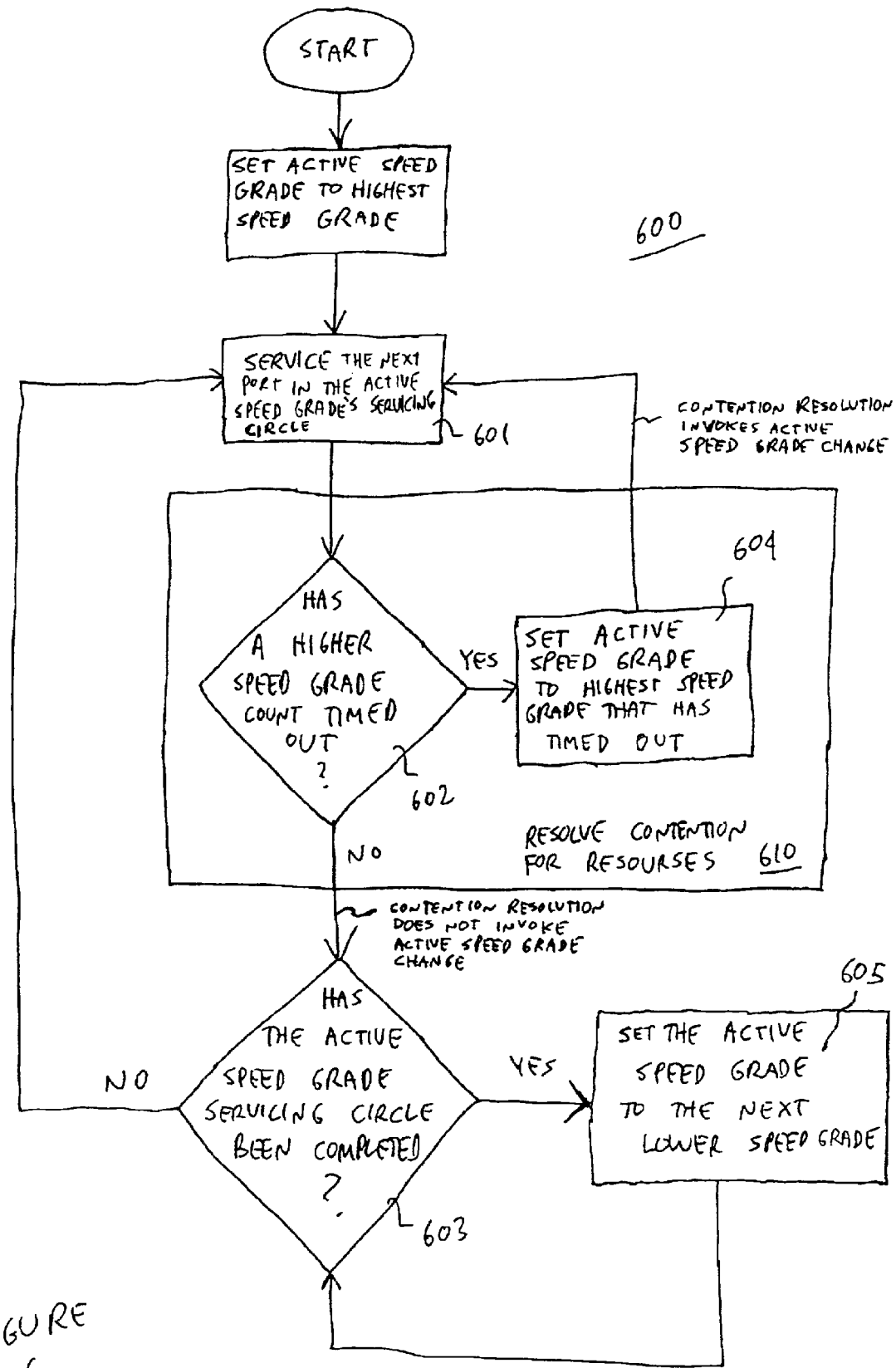
FIG. 6 shows a methodology that implements the scheduling technique of FIG. 3.

FIG. 6 shows an embodiment of a scheduling strategy 600 that may be executed by the scheduling logic 510 of FIG. 5.

The scheduling strategy 600 of FIG. 6 emphasizes the identification of an "active" speed grade. If a particular speed grade is deemed "active", the next port within the active speed grade's servicing "circle" is authorized to release a partition worth of data 601. That is, in the embodiment of FIG. 5b, the address corresponding to the next port in the active speed grade's link list is read from by the scheduler logic 510.

Referring back to FIG. 3, observe that separate speed grade counts are provided for each speed grade. The speed grade counts have a modulo provided by Equation 1 (for the highest speed grade) or Equation 2 (for speed grades beneath the highest speed grade). Each speed grade may be viewed as possessing its own count and modulo, where a count "tick" corresponds to the servicing of a partition worth of data.

The separate count and modulo for each speed grade may be used by the methodology of FIG. 6 to control the appropriate circular servicing for each speed grade. As seen in FIG. 6, after the next port in the active speed grade's "circle" has been serviced 601, an inquiry 602 is made as to whether or not a higher speed grade (relative to the active speed grade) count has timed out. If so, the highest of the speed grades to have timed out is set 604 as the active speed grade.

Thus, if a lower speed grade is set as the active speed grade, the methodology 600 of FIG. 6 allows for a higher speed grade to usurp "active" status once its corresponding count times out. An example of such a case is seen in FIG. 3 at the transition from the first to second scheduling cycle. That is, partition $304_1$ of the first scheduling cycle is devoted to the DS3_1 user. As such, the DS3 rate is the active speed grade for this partition 3041.

However, after the servicing of this partition $304_1$ the OC3 count times out (i.e., reaches zero). As a result of the contention resolution strategy 610 of FIG. 6, the active speed grade is set to the OC3 speed grade and the next partition $301_2$ is devoted to servicing an OC3 user. As the last OC3 user to be serviced was the OC3_3 user (during the servicing of partition $303_1$), the next user in the OC3 servicing circle is the OC3_1 user. As such, partition $301_2$ is devoted to servicing the OC3_1 user.

It is important to point out that the contention resolution strategy 610 of FIG. 6 is just one of many embodiments that could be employed. Examples of when contention for the switching/routing resources of the node may arise include: 1) a first speed grade is deemed active when another speed grade times out; or 2) two different speed grades have timed out. Generally, the scheduler logic 510 has to "decide" which port to service in light of a speed grade count timeout. This decision may or may not involve a change in the active speed grade. Other contention resolution approaches are described in more detailed below.

Note that if the contention resolution strategy does not result in a change in the active speed grade (e.g., the condition of the inquiry 602 is not met because a higher speed grade count has not timed out), a second inquiry 603 is made as to whether or not the servicing circle for the active speed grade has just been completed. That is, has a complete "run-through" of the active speed grade's servicing circle just been made? If not, the next port in the active speed grade's servicing circle is serviced 601. If so, the active speed grade is set 605 to the next lowest speed grade.

An example of the former and the later is seen in each of the scheduling cycles of FIG. 3. As an example of the former (where the speed grade servicing circle has not been completely run through), note that the highest speed grade count (OC3 count) times out at the end of each scheduling cycle. As such, consistent with the first inquiry 602 and the resetting 604 of the active speed grade to the highest speed grade (as just discussed just above), the first partition in every scheduling cycle (i.e., partitions $301_1, 301_2, \ldots 301_x$) is devoted to the servicing of an OC3 port.

After the servicing of an OC3 port in each scheduling cycle's first partition $301_x$, the first inquiry 601 does not rise to a logical truth because the OC3 count has just restarted (i.e., the OC3 count has a value of 3.0 as seen in FIG. 3). As such, the active speed grade remains at the highest speed grade and the methodology 600 of FIG. 6 flows to the second inquiry 603. The second inquiry 603 also does not rise to a logical truth because only the first port in the highest speed grade circle has been serviced.

As described in more detail below, within the embodiment of FIGS. 3 and 5a, the "done" bit within each memory structure 500a data entry indicates whether or not the servicing of the corresponding port is to be regarded as a completion of the corresponding speed grade's servicing circle. Better said, after the servicing of a port having a "done" bit value of "1", the state of the corresponding speed grade's servicing circle changes from "not completed" to "completed". As such, the highest speed grade servicing circle is not deemed "completed" until the third port (which serves the third OC3 user OC3_3) has been serviced.

Furthermore, upon the timeout of a speed grade's corresponding count, the state of that speed grade's servicing circle changes from "completed" to "not completed". Thus, according to the operation of the methodology of FIG. 6 (as observed in FIG. 3), the status a speed grade's servicing circle: 1) changes from "not completed" to "completed" upon the reception of an active "done" bit; and; 2) changes back to "not completed" from "completed" upon a timeout of that speed grade's corresponding count. Thus, for the OC3 speed grade in the first scheduling cycle of FIG. 3, the OC3 servicing cycle is deemed "not completed" between times T0 and T1 and "completed" between times T1 and T2. As such, the servicing of the first port (which serves the first OC3 user OC3_1) is deemed the start of each OC3 servicing circle.

After the first port has been serviced (which corresponds to the servicing of partition $301_x$), the second inquiry 603 is therefore a logical false. As a result, the next port in the active speed grade circle is serviced. That is, port 2 is serviced (via partition $302_x$) so as to service the second OC3 user: OC3_2. Again, after servicing port 2, both the first and second inquiries 602, 603 are a logical false. As a result, the last port in the active speed grade circle is serviced. That is, port 3 is serviced (via partition $303_x$) so as to service the third OC3 user: OC3_3.

Thus according to the operation of the methodology 600 of FIG. 6 and the example of FIG. 3, within each scheduling cycle, the highest speed grade "circle" is completely run through after the servicing of the third partition $303_x$. After the third partition $303_x$ is serviced, the first inquiry 602 is a logical false (because the highest speed grade count is a 1.0 (i.e., has not timed out) as seen in FIG. 3). The second inquiry, however, is a logical truth because the highest speed grade circle (being the active speed gra circle) has just been completed. As such, the active speed grade is set 605 the next lowest speed grade.

The next lowest speed grade in this case corresponds to the DS3 speed grade. Note that when the active speed grade is set 605 to the next lowest speed grade, the second inquiry 603 is reasked. This allows for the servicing of an even lower speed grade if the next lowest speed grade has already completed its servicing circle. Thus, in some cases the next lower speed grade remains as the active speed grade while in other cases an even lower speed grade may be set as the active speed grade.

An example of the former may be observed in the first and second scheduling cycles of FIG. 3. During the first and second scheduling cycles, after the servicing of the third partition $303_1$ and $303_2$, the second inquiry 603 results in a logical truth as discussed just above. That is, the highest speed grade has completed its servicing circle. As such, the active speed grade is set 605 to the DS3 speed grade and the second inquiry 603 is re-asked.

As discussed above, the transition as to where the DS3 servicing circle starts and ends is signified by the presence of the "done" bit in the memory architecture 500a of FIG. 5a. As the "done" bit resides in the data entry corresponding to the second DS3 port (i.e., user DS3_2 in this example) at address 505, the DS3 servicing circle is not deemed "completed" until the second DS3 port is serviced. Furthermore, the DS3 service is deemed "not completed" because, as seen in FIG. 3, the DS3 count had timed out at time T0.

As such, the DS3 speed grade servicing circle is deemed "not completed" after the third partition $303_1$ and $303_2$ have been serviced in either of the first or second scheduling cycles. That is, in the case of the first scheduling cycle (after the servicing of partition $303_1$), the first DS3 port has not yet been serviced; and, in the case of the second scheduling cycle (after the servicing of partition $303_2$), the second DS3 port has not yet been serviced. As a result, in both of these instances, the re-asking of the second inquiry 603 results in a logical false.

In response, the first DS3 port (which corresponds to the first DS3 user: DS3_1) is serviced with the fourth partition of the first scheduling cycle $304_1$ while the fifth port (which corresponds to the second DS3 user: DS3_2) is serviced with the fourth partition of the second scheduling cycle $304_2$. An example of where the re-asking of the second inquiry 603 results in a logical truth (so as to set the active speed grade to even lower speed grade) may be seen in the third scheduling cycle of FIG. 3.

After the servicing of the highest speed grade with the third partition $303_3$ of the third scheduling cycle, the methodology of FIG. 6 flows to the second inquiry 603. In this case, as discussed above, the highest speed grade circle has been completed and the second inquiry 603 results in a logical truth. As such, the active speed grade is set 605 to the next lowest speed grade which corresponds to the DS3 speed grade.

The second inquiry 603 is reasked. Here, however, a logical truth results because (as of the servicing of partition $303_3$) the DS3 scheduling circle has been completed. That is, as there are two DS3 users, both were serviced through the previous two scheduling cycles. Because the re-asking of the second inquiry 603 results in a logical truth, the active speed grade is set to the next lower speed grade with respect to the DS3 speed grade. That is, the active speed grade is set to the DS1 speed grade.

The second inquiry 603 is again re-asked. Again, the transition as to where the DS1 servicing circle starts and ends is signified by the presence of the "done" bit in the memory architecture 500a of FIG. 5a. As the "done" bit resides in the data entry corresponding to the twenty eighth DS1 port (i.e., user DS1_28 in this example) at address 533, the DS1 servicing circle is not deemed "completed" until the twenty eighth DS1 port is serviced.

Furthermore, the DS1 service is deemed "not completed" because the DS1 count had timed out as of time T0. Thus, in this case, the inquiry 603 with respect to the DS1 servicing circle results in a logical false and; as such, causes the first DS1 port to be serviced 601 with partition $304_3$. The pattern observed over the first three scheduling cycles is essentially repeated, with the exception that the last partition (e.g., the partition that is positioned analogous to partition $304_3$), over the course of execution by the scheduler logic 510.

The partition that is positioned analogous to partition $304_3$ services the next DS1 user in the DS1 servicing cycle. Eventually, after the $84^{th}$ scheduling cycle, the twenty eighth DS1 user (DS1_28) will be serviced as seen in partition $304_{84}$ of FIG. 3. In this example, under full load conditions, the pattern of the 84 scheduling cycles observed in FIG. 3 will then be repeated over the following scheduling cycles.

c. Implementation of Circular, Per Speed Grade Servicing

Referring to the memory structure 500a of FIGS. 5a, note that each data entry has an associated port identification (PID) value. When a data entry is read from the memory structure 500a, 500b, the data entry's PID value is used to authorize the release of a partition worth of data from the port that corresponds to the PID value. Note that the actual packet data may be released from a packet buffer memory and that the actual flow of information from a port may correspond to a flow of packet identifiers that point to the packets to be released from buffer memory. The phrase "release of a partition worth of data from a port" and the like may be construed as to include such an approach.

For example, in the embodiment of FIG. 5a, $PID_1$ is used to release a partition worth of data from port 1 (for the first OC3 user OC3_1); $PID_2$ is used to release a partition worth of data from port 2 (for the second OC3 user OC3_2); $PID_3$ is used to release a partition worth of data from port 3 (for the third OC3 user OC3_3), etc. In the embodiment shown in FIG. 5b, the PID value corresponds to a multiplexer 520 "channel select" value. The channel select value determines which port (of the ports configured in the node) is sent a release signal that effectively authorizes the release of a partition worth of data from the port.

That is, for example, the $PID_1$ value enables the "Port 1" output of multiplexer 520 (which would trigger the release of a partition worth of data from port 401 of FIG. 4); the $PID_2$ value enables the "Port 2" output of multiplexer 520 (which would trigger the release of a partition worth of data from port 402 of FIG. 4), etc. In an alternate embodiment, the PID data structure is routed to the appropriate port (in response to its value). Regardless, when an address for a particular port is offered to the memory 500a, 500b, the PID value read from that address is used to release a partition worth of data from the port that corresponds to the PID value. Each port 401 through 433 may be realized with an organized memory or register structure (e.g., where each port corresponds to a region of a memory or register). The scheduler 450 may be implemented as a processor that runs software or as a logic circuit (or as a combination of both) that has an understanding of the memory organization for the ports and reads or otherwise authorizes the release of a proper number of packet identifiers from the proper memory or register location(s) to the release line according to the scheduling technique methodology described above.

Coupled to the PID value within each data entry, as shown in FIG. 5a, is the aforementioned: 1) link pointer to the next data entry in the circular link list for the speed grade to which the PID value belongs; and 2) the "done" bit value that indicates whether the port marks the end of the speed grade servicing circle. When a data entry is read from the memory 500a, 500b, the PID value is forwarded to the multiplexer 520 (to release a partition worth of data from the port represented by the PID value) while the link list pointer and "done" bit are forwarded to the scheduler logic 510.

In the embodiment of FIG. 5, the scheduler logic 510 keeps track of information that is sufficient to execute the methodology of FIG. 6. For example in an embodiment the scheduler logic 510 keeps track of, for each speed grade: 1) the next port to be serviced according to the circular servicing approach discussed above; 2) the status of each circular service (i.e., "completed" or "not completed"); and 3) contention resolution information such as whether or not a higher speed grade count has timed out.

In order to keep track of the next port to be serviced according to the circular servicing approach, the scheduler logic 510 may be designed to maintain storage space (e.g., either internal or external register or memory space) for each speed grade. Recall that the next port to be serviced in the circular link list (for a particular speed grade) is stored as a link pointer in the data entry that corresponds to the prior port. Thus, as the PID value for a particular port is being read from memory, the address for the next port (at the same speed grade) is simultaneously being read.

By accepting and storing this address for the next port, the scheduler logic 510 is able to keep track of the next port to be serviced for a particular speed grade. Thus, whenever the speed grade becomes active, the scheduler logic 510 can refer to this stored address and use it to perform a memory read. Once an address is used it may be flushed and replaced with the new, next address for that speed grade as it is received from the read operation. By storing an address for each speed grade, the scheduler logic 510 can easily change to any new active speed grade and continue its proper circular service.

The status of the circular service for each speed grade (i.e., "completed" or "not completed") may be determined, as described above, in light of the reception of the "done" bit and the count for each speed grade. Thus, the scheduler logic 510 may be designed to store the modulo value for each speed grade as well as perform the corresponding count for each speed grade. When the count for a particular speed grade times out, the status of the circular service for that speed grade may be deemed "not completed". Furthermore, as discussed above, when a "done" bit value of "1" is observed during a memory read, the scheduler 510 may be designed to recognize that the servicing circle for the speed grade has just been "completed".

It is important to note the ease at which new ports (and their corresponding users) may be configured into a networking system that employs the scheduling approach discussed above. That is, a new port may be entertained for a new user by simply upgrading the memory structure 500a. For example, the number of DS3 users may be expanded simply by inserting another data entry into the memory and configuring the link pointers of the DS3 speed grade to effectively include the new entry into the servicing circle (e.g., by modifying a present link pointer entry to point to the new data entry; and, having the new data entry link pointer maintain the value originally held by the data entry being modified).

Similarly, a port or user may be easily removed from service by simply cutting a data entry out of its speed grade link list circle. For example, by modifying the link pointer entry that points to the data entry to be removed so as to, instead, point to the data entry that is pointed to by the data entry to be removed, the data entry to be removed is removed from the speed grade servicing circle. As the ports themselves may be implemented as organized memory or register structures (as discussed above), ports may also be easily added or removed as well.

Note that the particular resource contention resolution approach 610 of FIG. 6 effectively serves higher speed grades at the expense of slower speed grades. For example, if a node is configured to be oversubscribed (i.e., the aggregate bandwidth of all the ports/users it handles is greater than the routing or switching bandwidth of the node), higher speed grade users may not suffer any detriment in service while lower speed grade users may be completely starved. This follows from the fact that the contention resolution methodology 610 of FIG. 6 automatically changes the active speed grade to the highest, timed out speed grade.

Alternate contention resolution embodiments may exist. For example, in an approach that more evenly distributes the service degradation associated with over subscription, the contention resolution methodology may instead decide to change the active speed grade to the speed grade having the port or user that has waited the longest time after its count has timed out and was not serviced within the speed grade count (i.e., a speed grade count expired before all of its users or ports could be serviced).

d. Port Queuing

Figure 7:
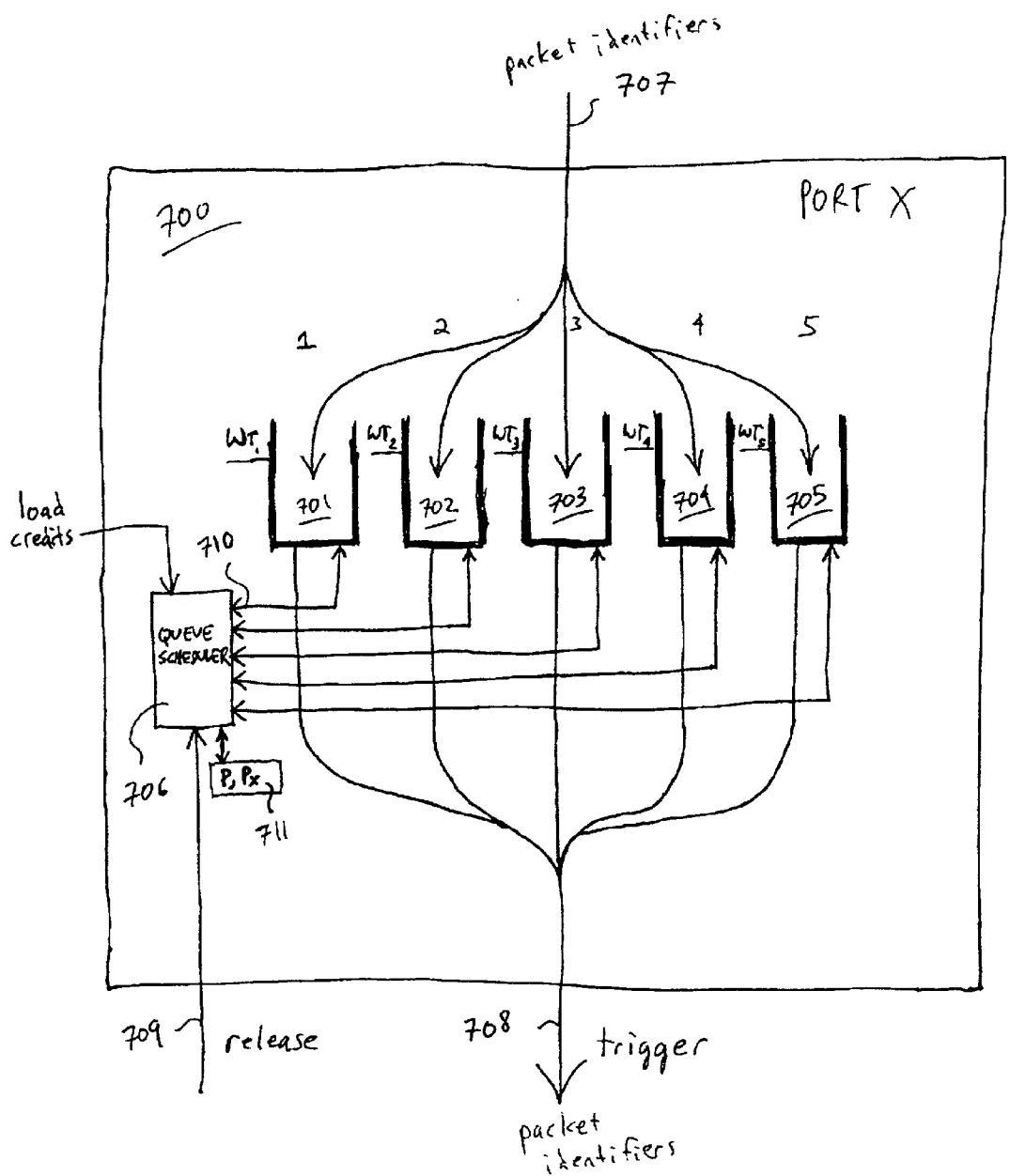
FIG. 7 shows an output port divided into a plurality of queues.

FIG. 7 shows an embodiment of a port 700 that may be used for any of the ports 401 through 433 shown in FIG. 4. That is, for example, if port 701 of FIG. 7 corresponds to the first port 401 of FIG. 4, release line 409 of FIG. 4 and release line 709 of FIG. 7 may be viewed as the same release line. Similarly, trigger line 408 of FIG. 4 and trigger line 708 of FIG. 7 may be viewed as the same trigger line. Note also that, referring to FIG. 5b, release line 509 may correspond to release lines 409 and 709 of FIGS. 4 and 7, respectively.

As mentioned above, release line 709 effectively provides port 700 with authorization to release a partition worth of data. As such, after this notification, a series of packet identifiers (e.g., that each point to a memory location where a packet may be found) flow from one or more of queues 701 through 705 to the output 708 of the port. As discussed above, the emission of a packet identifier along the port output 708 triggers the release of a packet (e.g., from a packet buffer memory). The combined total size of all the packets that are released from the packet buffer memory corresponds to a partition worth of data.

Each packet identifier that is placed into the port (via the port input 707) is stored into a particular queue. For example, in an embodiment, each packet identifier not only points to a packet but also signifies which of the port queues 701 through 705 the packet identifier should be stored within. Referring to FIG. 1c, in an embodiment, integrating a "queue id" as part of a packet identifier is part of the processing that is performed by the packet processing pipeline 130.

In an embodiment, each port queue 701 through 705 corresponds to a different priority. That is, for example, port queue priority increases from right to left (thus port queue 701 corresponds to the highest priority queue and port queue 705 corresponds to the lowest priority queue). Packet identifiers stored in higher priority queues generally experience less delay than packet identifiers stored in lower priority queues. That is, packet identifiers that are stored in higher priority queues tend to be released from their respective queue (and forwarded to port output 708) after having "waited" for less time than other packet identifiers that are stored in lower priority queues.

As such, if a port is provided for each user, the networking system is able to differentiate the traffic being sent to the same user. For example, a user may be interested in receiving both traditional data traffic (e.g., emails, files, etc.) and real time traffic (e.g., a live telephone call conversation). As real time traffic generally requires low latency while traditional data traffic is usually indifferent to the amount of latency, packet identifiers that point to packets associated with real time traffic may be placed in a high priority queue while packet identifiers that point to packets associated with traditional data traffic may be placed in a lower priority queue.

In one embodiment, there are five port queues 701 through 705 as seen in FIG. 7. As such there are five different priority levels. One queue, such as the highest priority queue 701, may be used to hold packet identifiers that point to networking control packets. Networking control packets are used for networking maintenance purposes (e.g., upgrading network topology information, failure reporting, etc).

In an embodiment a queue, such as the second highest priority queue 702, is used to store packet identifiers that point to packets associated with a user's "real time" traffic. As discussed, "real time" traffic is traditionally viewed as a "live" transaction where the failure to quickly receive information results in poor communication. Examples include a "live" telephone conversation or video conference.

Verbal communication between people can become disruptive if there exists too long a latency between the speaking of a first person and the listening of a second person. As such, a network attempts to send this type of information through a network "faster" than other types of information (e.g., within 1.0 second or less or within 0.1 second or less). In an embodiment, queue 702 may be used to store packet identifiers that point to this type of traffic.

In an embodiment a queue, such as the third highest priority queue 703, is used to store packet identifiers that point to a user's "fast data" traffic. Fast data traffic may be characterized as being somewhere between "real time" traffic and "traditional" data traffic. As such, fast data traffic corresponds to traffic that should have lower latency than traditional data traffic but does not necessarily require the low latencies of real time traffic (e.g., less than a few seconds or less than a minute). Examples include Automatic Teller Machine transactions or credit card transactions. In these applications, for example, a customer typically does not mind waiting a few seconds or minutes for his/her transaction. As such, a corresponding latency is appropriate.

In an embodiment a queue, such as the fourth highest priority queue 704, is used to store packet identifiers that point to a user's traditional data traffic. Traditional data traffic is traffic that is relatively indifferent to the latency through the network. As such, latencies beyond a few minutes or higher may be acceptable. Examples include various files and e-mail traffic.

In an embodiment a queue, such as the lowest priority queue 705, is used to store packet identifiers that point to "best effort" traffic. Best effort traffic is, typically, traffic that has exceeded a user's allocated bandwidth or otherwise goes beyond the resources of the network or networking system. Note that in various embodiments, however, a best effort queue (e.g., queue 705) may be configured to store packet identifiers that point to a user's traditional data traffic as well.

This may allow for multiple grades of "fast traffic". For example, packet identifiers for a first, higher priority fast traffic may be stored in the third highest priority queue 703; packet identifiers for a second, lower priority fast traffic may be stored in the fourth highest priority queue 704; and packet identifiers for traditional data traffic and best effort traffic may be queued together in the lowest priority queue 705. Note that the above examples provided for the temporal characteristics of each type of traffic (e.g., less than a second for "real time" traffic) are exemplary and may vary from embodiment to embodiment. As such, other embodiments are possible that exist outside the ranges provided above.

In an embodiment the packet processing pipeline 130 of FIG. 1c is able to identify the type of traffic that each packet identifier corresponds to and, in response, integrate the proper queue id into each packet identifier. It is important to point out that other embodiments are also possible (as to both the number of queues and the types of traffic that are effectively queued by them).

As discussed above, the port bandwidth is controlled by controlling how often a partition worth of data is released from the port. In an embodiment, a partition worth of data, P, may be expressed as:

$$P = XT \qquad \text{Eqn.3}$$

where X is the rate of the highest speed grade serviced by the node and T is the amount of time consumed per scheduling cycle. For example, referring to FIG. 3, T corresponds to the temporal width of each scheduling cycle (i.e., the temporal distance between T2 and T0 for the first scheduling cycle) and X corresponds to a rate of 155.52 Mb/s.

Thus, for a scheduling cycle width of 1 second (i.e., T=1 sec), a partition worth of data P corresponds to 155.52 Mb of data. In this case, the release of a partition worth of data corresponds to a number of packet identifiers flowing from the port output 708 where the combined size of all the packets pointed to by the flow of packet identifiers is 155.52 Mb. As another example, for a scheduling cycle width T=0.001 sec, a partition worth of data P is 155.52 Kb. In this case, the combined size of all the packets pointed to by the flow of packet identifiers from the port output 708 will be 155.52 Kb.

It is important to point out, however, that the phrase "a partition" or a "partition worth of data", with respect to port queuing, may not only correspond to "a partition worth of data that is coextensive with a highest speed grade" (as explicitly defined in Equation 3) but also may correspond to "an amount of data". That is, in one embodiment, the discussion of port queuing discussed herein with respect to FIGS. 7, 8 and 9 may be used to support the scheduling technique discussed with respect to FIGS. 3, 5 and 6 (as evident from Equation 3).

Figure 8:
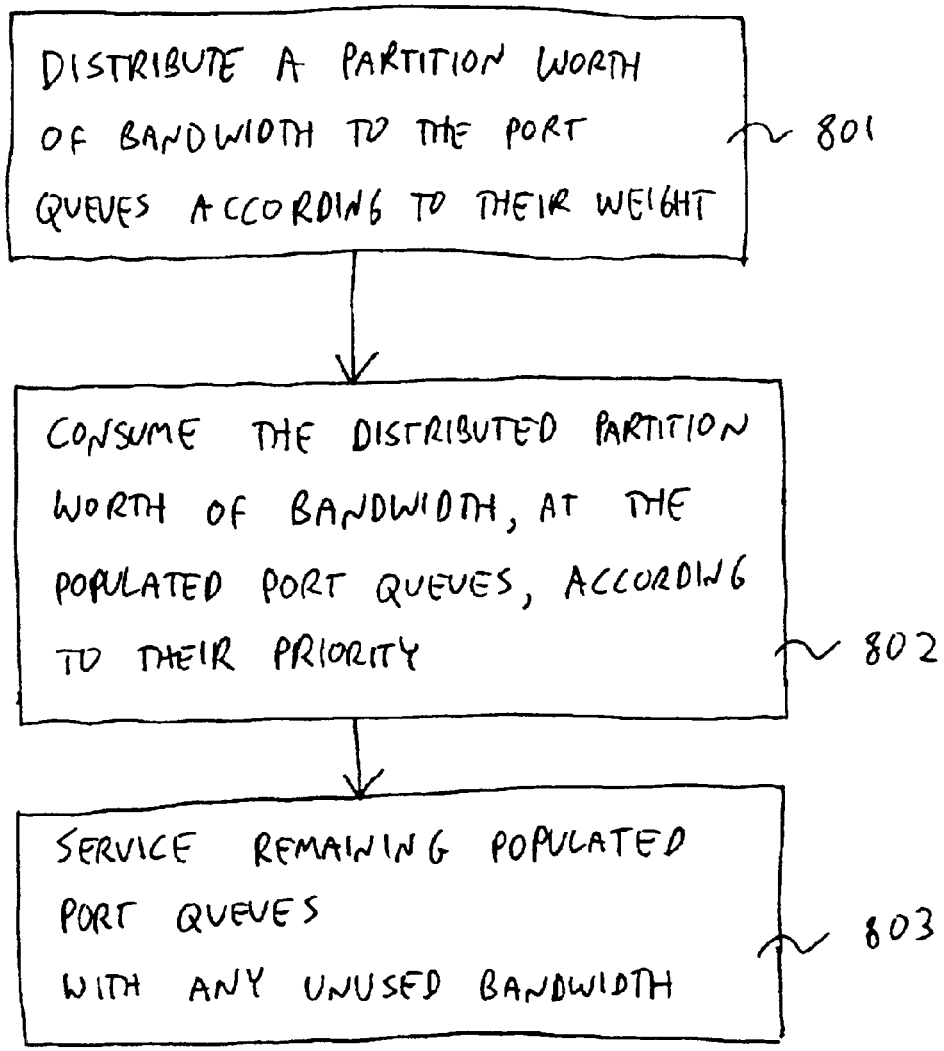
FIG. 8 shows a methodology that services an output port having a plurality of queues, such as the output port observed in FIG. 7.
Figure 9:
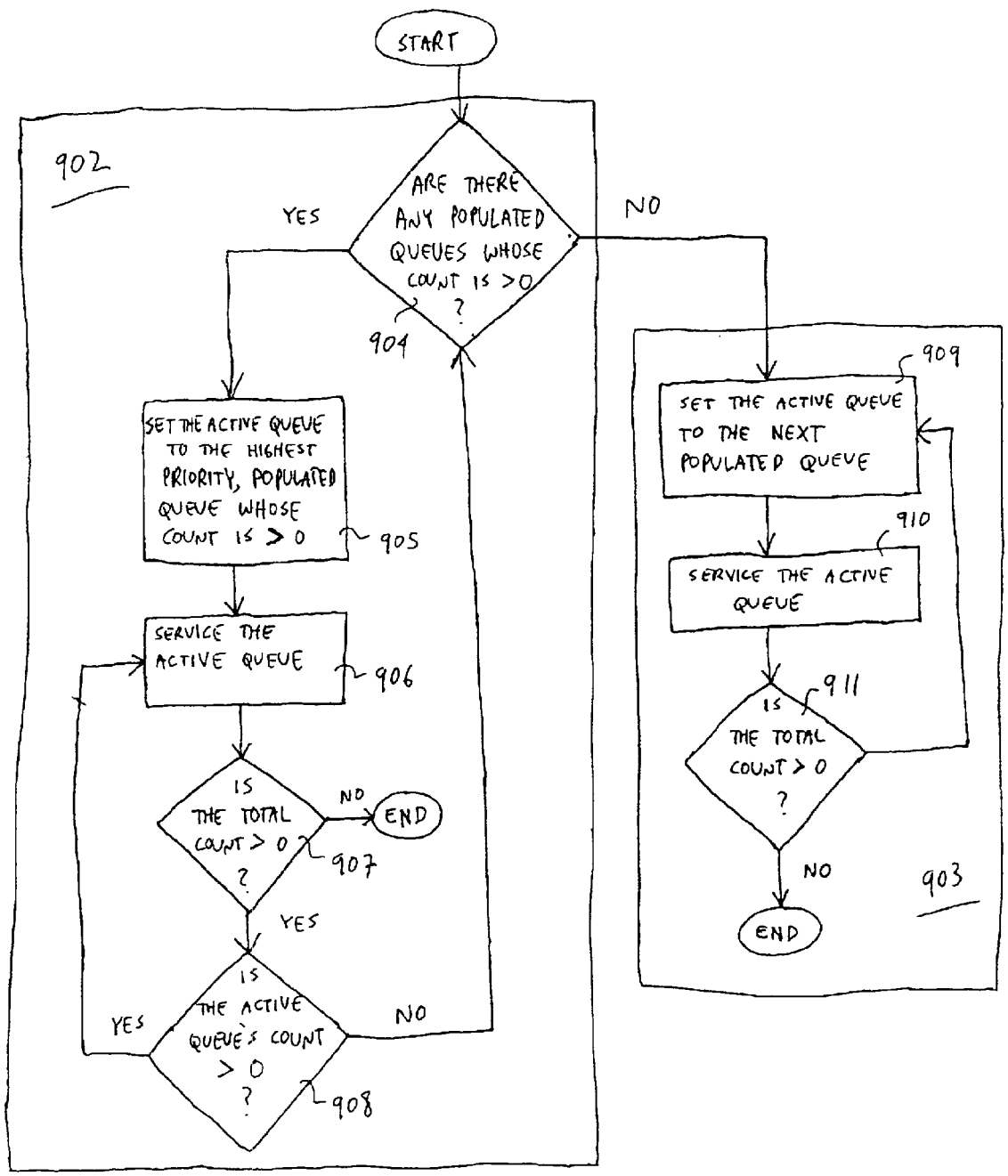
FIG. 9 shows a detailed embodiment of a methodology that corresponds to the methodology shown in FIG. 8.

However, the discussion of port queuing discussed herein with respect to FIGS. 7, 8 and 9 may also be used to support other scheduling techniques that simply provide an amount of data for a port to release (i.e., that does not necessarily correspond to an amount that is coextensive with a highest speed grade). As such, with respect to port queuing, use of the term "partition" and the like should not be construed as being automatically limited to include the scheduling technique outlined with respect to FIGS. 3, 5, and 6.

In an embodiment that may be implemented with the approach of FIG. 7, each queue 701 through 705 is given a "weight" that corresponds to a service rate that it will receive. That is, the amount of bandwidth given to a particular port may be viewed as being subdivided. Each subdivision of the port's bandwidth may be used to service a particular port queue. Thus, assigning a unique weight to a queue may be achieved by assigning to a queue a fixed amount of data that it may release for each authorization received on the release line 709.

The fixed amount of data, which may also be referred to as a sub-partition $P_x$, may be expressed as:

$$P_x = wt_x P; \text{ for } x=1 \text{ to } N \qquad \text{Eqn. 4}$$

where: 1) $P_x$ is the sub partition for queue "x"; 2) $wt_x$ is the port bandwidth sub division that is given to queue "x" (e.g., as expressed in decimal percentage terms); and 3) N is the number of queues that are given a guaranteed percentage of the port's bandwidth. For example, if each of the queues 701 through 705 of FIG. 7 are given 20% of the port's bandwidth, then (from Equation 4) the sub partition allocated to each queue is 0.2P.

As such (from the examples just above), for a scheduling cycle of T=1 sec employed by the exemplary node that was discussed with respect to FIGS. 2 through 5, each queue is allocated a sub partition of 31.104 Mb (i.e., 155.52 Mb×0.2= 31.104 Mb); and, for a scheduling cycle of T=0.001 sec, each queue is given a sub partition of 31.104 Kb. Thus, in the former case, each queue 701 through 705 can release a flow of packet identifiers (for each authorization received upon release line 709) that point to a series of packets whose combined size corresponds to 31.104 Mb. This corresponds to a permitted flow of 155.53 Mb worth of data from all of the queues combined.

Thus, to review, each queue can be configured with a priority and a bandwidth. Higher priority queues generally have lower latency than higher priority queues. Latency is a function of the offered load and service rate for each queue. Generally, latency increases as the offered load to a queue increases and/or the service rate from a queue decreases. Thus, a queue's latency increases as the number of packet identifiers it receives over time (i.e., its offered load) increases and/or the sub division of the port bandwidth that it receives (i.e., its service rate) decreases.

In an embodiment, the node or networking system is configured to limit traffic flows assigned to a higher priority queue such that the combined rate of these flows does not exceed the port bandwidth sub division allocated to the higher priority queue. Here, as the maximum offered load to the queue is less than its service rate, the latency through the higher priority queue is minimal. In a further embodiment, the node is configured such that the combined rate of traffic flows assigned to a lower priority queue may exceed the sub division of port bandwidth allocated to the lower priority queue. As the maximum offered load to the queue may be greater than its service rate, the latency through the lower priority queue will increase as the ratio of offered load to service rate rises.

The queue scheduler 706 is responsible for controlling, from each queue 701 through 705, the appropriate flow of packet identifiers per authorization received on release line 709. FIG. 8 shows a methodology that may be employed by the queue scheduler 706 of FIG. 7. As seen in FIG. 8, upon the reception of an authorization to release a partition worth of packets, the scheduler 706 effectively distributes 801a partition worth of bandwidth to the queues according to their weight. A partition worth of bandwidth corresponds to the service rate provided to the port as a whole.

In one approach, the queue scheduler 706 maintains the sub partition $P_X$ that is allocated to each queue (as expressed in Equation 4) as well as maintains the total partition worth of data, P. For example, in an embodiment, the queue scheduler has associated storage space 711 (e.g., an internal or external register or memory location) that keeps track of the sub partition $P_X$ for each queue as well as the total partition P. Upon the reception (from release line 709) of an authorization to release a partition worth of data, the queue scheduler 706 reads the information from the storage space.

In an alternate embodiment, the storage space 711 maintains the weight for each queue $wt_x$ and the total partition size (P) is stored in the queue scheduler's storage space 711. In this case, upon the reception of an authorization to release a partition worth of data, the queue scheduler 706 calculates (rather than simply reads) the sub partition Px for each queue. In another alternate embodiment, the authorization received on release line 709 takes the form of a binary word having a value that corresponds to the total partition size (P). In this case, the storage space 711 only needs to store the sub partition (or weights) for each queue.

Referring to FIGS. 7 and 8, once the queue scheduler 706 has possession of the sub partitions allocated to each queue (which may be viewed as a form of distribution of the entire partition), it initiates the consumption 802 of the distributed partition worth of bandwidth, at the populated queues, according to their priority. That is, those queues having at least one packet identifier (i.e., a populated queue) are serviced in accordance with their priority.

In an embodiment, the priority of a queue is reflected not only in its latency but also in its servicing position with respect to other queues. That is, a higher priority queue is serviced by the scheduler 706 before a lower priority queue is serviced. For example, if the priority ranks from highest to lowest from left to right in FIG. 7 (i.e., queue 701 is the highest priority queue and queue 705 is the lowest priority queue), a queue is serviced by the scheduler 707 only after those populated queues on its left have been serviced to the extent of their sub partition.

As such, with respect to the embodiment of FIG. 7, the consumption 802 of the distributed partition worth of bandwidth is implemented by servicing the populated queues, from left to right, to the extent of the sub partition for each. For example, if queue 701 and 703 through 705 are populated (i.e., only queue 702 is empty), queue 701 is serviced to the extent of its sub partition $P_1$, then queue 703 is serviced to the extent of its sub partition $P_3$, then queue 704 is serviced to the extent of its sub partition $P_4$ and then queue 705 is serviced to the extent of its sub partition $P_5$.

Again, servicing a queue to the extent of its sub partition corresponds to controlling the flow of packet identifiers from the queue such that the combined size of all the packets pointed to by the flow is approximately the same as the sub partition allocated to the queue. As this activity effectively consumes the port bandwidth that was distributed to the queue, servicing a queue to the extent of its sub partition corresponds to the consumption of a piece of the distributed partition worth of bandwidth that is allocated to the port as a whole.

As described in more detail, initially consuming 802 the distributed partition worth of bandwidth, at the populated queues, in accordance with their priority effectively breaks the queue servicing into two components: 1) a first component devoted to the providing of a "guaranteed" amount of bandwidth to one or more queues (as configured through their weights); and 2) a second component devoted to providing any excess bandwidth (should it exist) to the queues (e.g., according to a fairness routine). Referring to FIG. 8, the first component corresponds to methodology 802 while the second component corresponds to methodology 803.

For configurations where the combined total of the queue weights add to a value of 1.00 or less, the sub-partitions may be viewed as a guaranteed amount of service that is provided to its corresponding queue—regardless of its priority. Here, as the combined total of the queue weights add to a value of 1.00 or less, the combined data total of all the sub partitions adds to no more than the total partition of data, P, that is serviced from the port as whole. Thus, focusing initially on the servicing of each queue's sub-partition ensures that lower priority queues receive their guaranteed amount of service even under heavy traffic loading conditions.

In alternate configurations, the combined total of all the queue weights may add to a value that is greater than 1.00. Here, as the combined total of the queue weights add to a value greater than 1.00, the combined data total of all the sub partitions is greater than the total partition of data, P, that is serviced from the port as whole. In a sense, the port is "oversubscribed". Under modest traffic loading conditions, the over subscription may not be noticeable because various queues may be empty (i.e., unpopulated) or only slightly populated (i.e., the offered load to the port is less than the partition P provided to the port).

As such, the queues still enjoy their guaranteed service rate. Under heavy traffic loading conditions, however, the over subscription may cause some queues to receive less than their guaranteed service rate. Nevertheless, the priority aspect of the servicing (i.e., where higher priority queues are served to the extent of their sub partition before lower priority queues) guarantees the service rate of the higher priority queues "up to" a combined queue weight of 1.00.

That is, starting from the highest priority queue and working downward (e.g., to the right as seen in FIG. 7), each queue is fully serviced to the extent of its sub partition before the next lower priority queue is serviced. Eventually the total amount of data that has been released corresponds to a full partition and the servicing of the port as a whole stops. In this case, those queues that fall within the first 1.00 of combined total queue weight still enjoy their guaranteed service rate.

Thus, by initially servicing the queues to the extent of their sub partition in light of their priority, the highest priority queues are guaranteed their "configured for" service rate in all cases. Furthermore, in cases where the combined queue weight is less than 1.00, all of the queues are guaranteed their "configured for" service. Whether the combined weights are greater than or less than 1.00 (as well as how the weights are distributed), is a decision made available to those who configure the node.

Note that, in one embodiment, a strict round robin approach can be emulated by the port as a whole if the queue weights are set identically to one another and add to a combined value of 1.00. In cases that deviate from this approach (i.e., where queue weights are individually tailored), the overall port behavior may correspond more to that of a weighted fair queue.

Regardless of how the queue weights are distributed, in various instances there may be "unused" bandwidth remaining after each of the populated queues have been serviced to the extent of their sub partition. For example, if a particular queue is experiencing light loading conditions, it may be unpopulated or (although populated) may have less stored traffic than its sub partition allows.

In the former case, no queue service transpires while in the latter case the servicing corresponds to less than a full sub partition. As such, after all the populated queues have been serviced to the extent of their sub partition (note that the phrase "to the extent of their sub partition" may be read as "to no more than a full sub partition"), the combined size of all the packets pointed to from the resulting flow of packet identifiers may be less than a full partition worth of data P.

As such, the difference between a full partition worth of data P and the combined size of all the packets that have been pointed to may be viewed as "unused" bandwidth. This unused bandwidth may then be applied to one or more populated queues that exist within the port. As such, as seen in FIG. 8, the second component of queue servicing involves the servicing 803 of remaining populated port queues (e.g., coextensively) with any unused bandwidth.

In various instances, the unused bandwidth helps "clear out" a queue who has just experienced an exceptionally high offered load. For example, if a queue suddenly receives a large number of packet identifiers, the guaranteed service rate (as fulfilled by the servicing of a full sub partition) may not be sufficient to empty out the queue. In this case, the application of any unused bandwidth to the queue will help reduce the population of the queue.

In an embodiment, the unused bandwidth is applied "fairly" to all the queues. For example, in one approach, a "round robin" pointer is kept by the queue scheduler 706. Whenever unused bandwidth arises from an authorization to release a partition worth of data, the queue scheduler 706 applies the unused bandwidth to the queue that is pointed to by the round robin pointer. The round robin pointer is then incremented so as to point to the "next" queue (e.g., queue 704 is queue 703 is being serviced with the unused bandwidth).

Once the queue originally pointed to by the round robin pointer is empty, the queue scheduler 706 applies the unused bandwidth to the "next" queue (as its currently specified by the round robin pointer) and increments the pointer again. In many cases, eventually, the unused bandwidth is completely consumed such that a full partition worth of data is serviced from the port. At this point, the servicing of the port is completed.

The next amount of unused bandwidth (that arises from a following authorization to release a partition worth of data) will be applied to the queue specified in the round robin pointer. In alternate embodiments, the unused bandwidth may be applied in a less fair manner. For example, rather than a strict round robin approach, higher priority queues may be serviced with the unused bandwidth more frequently than the lower priority queues (e.g., in a weighted fashion as discussed above).

FIG. 9 shows a possible, more detailed, embodiment of portions of the methodology outlined in FIG. 8. Specifically, flow 902 of FIG. 9 may be viewed as an embodiment of flow 802 of FIG. 8. Also, flow 903 of FIG. 9 may be viewed as an embodiment of flow 803 of FIG. 8. In the approach of FIG. 9, the queue scheduler 706 controls the proper release of packet identifiers from the various queues by maintaining: 1) a "queue count" for each queue that counts the size of the packets being released from the queue (recalling that packet identifiers may be configured to specify the size of the packet that it refers to); and 2) a "total count" that counts the size of the packets being released from the port as a whole.

The queue count is used to control the first ("guaranteed") component of a queue's servicing as described above. Here, a queue's sub partition size $P_X$ is used to limit the queue count. That is, initially the queue count is set equal to the queue's sub partition size. The queue count counts down by an amount that corresponds to the size of a packet effectively released from the queue (e.g., as measured in bytes). Once the queue count reaches zero, the queue scheduler 706 understands that a full sub partition for the queue has just been serviced.

The "total count" is used to terminate the servicing of a port after it services the queues in response to an authorization to release a partition worth of data. Here, the port's full partition size P is used as a limit on the total count. That is, initially the total count is set equal to the full partition size P. The total count counts down by an amount that corresponds to the size of each packet that is released from the port. Once the total count reaches zero, the queue scheduler 706 understands that a full partition worth of data has been serviced from the port.

As discussed above, after the queue scheduler 706 receives authorization to release a partition worth of data, the queue scheduler 706 obtains an understanding of the individual sub partitions to be applied to each queue. This activity effectively distributes a full partition worth of bandwidth to the individual queues and corresponds to the START methodology seen in FIG. 9. That is, the methodology of FIG. 9 assumes that the authorization to release a partition worth of data has already been received and that the queue scheduler 706 has already distributed the full partition of bandwidth to the individual queues.

The scheduling methodology can emphasize the identification of an "active" queue who is currently being focused upon for servicing. Thus, after receiving authorization to release a partition worth of data, the queue scheduler 706 sets the active queue 905 to the highest priority, populated queue whose queue count is greater than zero (if such a queue exists). The queue scheduler 706 may be configured to inquire as to the population and count status of each queue before declaring an active queue; or, may simply refer to the highest priority queue and declare it active if these conditions are met.

The active queue is then serviced 906. That is, a packet identifier is released from the queue and emitted from the port output 708. The queue count and total count are decremented in proportion to the size of the packet effectively released from the queue. If the total count reaches or falls below zero the servicing of the port is terminated 907. If the total count is greater than zero, the active queue is serviced again 906 provided that the queue count is greater than zero 908. The process iterates until the queue count reaches or falls below zero (or the queue becomes empty). At this point, a full sub partition has been serviced from the active queue Note that some queue counts may fall below zero as a result of this methodology. In an embodiment, the negative queue counts are "deficit adjusted" on the following authorization. For example, if a particular queue has a sub partition size of $P_X$ and the queue count falls below zero to a value of $-Z$ (which stops the servicing of that queue); upon the next authorization to release a partition worth of data for that port, the queue count value is initially set to $P_X-Z$ (rather than $P_X$) so that the integrity of the bandwidth configured for that queue is maintained.

After a full sub partition has been serviced from the active queue, the queue scheduler 706 sets the active queue to the next highest priority populated queue whose queue count is greater than zero 905. The process of continually servicing the next highest priority, populated queue (to the extent of a full sub partition of data) continues until the total count reaches or falls below zero or until each queue given a sub partition has either 904: 1) had its queue count reach or fall below zero; or 2) become empty.

At this point, the first servicing component (i.e., the guaranteed service rate component) is complete. As such, if any unused bandwidth remains (i.e., the total count is greater than zero), the active queue falls to the next populated queue 909. Note that the scheduler may be configured to have a round robin pointer that points to the next queue to be serviced with unused bandwidth.

If the queue that is pointed to is unpopulated, the round robin pointer is incremented until a populated queue is pointed to (which then becomes the active queue). The populated queues are then serviced in round robin fashion until the total count reaches or falls below zero. In an embodiment, if every queue is empty before the total count reaches of falls below zero, the servicing of the port terminates and the unused bandwidth is simply disposed of.

The queue scheduler 706 may be designed with logic that performs consistent with the methodology described above. The queues may be implemented as link lists within a memory device. For example, in one embodiment, each packet identifier data entry in the memory includes a pointer to the next packet identifier in the queue. Thus, the scheduler logic 706 can service the queues by reading a packet identifier from a memory device. The address for the next packet identifier in the queue is grasped by the queue scheduler 706 while the memory is being read.

Referring to FIG. 7 note that the queues 701 through 705 may be implemented as organized memory or register structures. That is, for example, a first queue (e.g., queue 701) corresponds to a first memory or register region, a second queue (e.g., queue 702) corresponds to a second memory or register region, etc. The queue scheduler 706 may be implemented as a processor with software or as a logic circuit (or combination of both) that implements the queue servicing processes and methodologies just described above.

Note also that embodiments of the present description may be implemented not only within a semiconductor chip but also within machine readable media. For example, the designs discussed above may be stored upon and/or embedded within machine readable media associated with a design tool used for designing semiconductor devices. Examples include a netlist formatted in the VHSIC Hardware Description Language (VHDL) language, Verilog language or SPICE language. Some netlist examples include: a behaviorial level netlist, a register transfer level (RTL) netlist, a gate level netlist and a transistor level netlist. Machine readable media also include media having layout information such as a GDS-II file. Furthermore, netlist files or other machine readable media for semiconductor chip design may be used in a simulation environment to perform the methods of the teachings described above.

Thus, it is also to be understood that embodiments of this invention may be used as or to support a software program executed upon some form of processing core (such as the CPU of a computer) or otherwise implemented or realized upon or within a machine readable medium. Note also that, the methodologies described above may be implemented as a software program and executed by a processor (e.g., microprocessor, collection of microprocessors, embedded processor, etc.). A machine readable medium includes any mechanism for storing or transmitting information in a form readable by a machine (e.g., a computer). For example, a machine readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An apparatus, comprising:
   a network node that executes a series of scheduling cycles in order to allocate switching or routing bandwidth within a networking system, wherein a highest speed grade is identified for a highest amount of allocated bandwidth, and wherein lower speed grades are identified for speeds that are less than the highest amount of allocated bandwidth, wherein each of the scheduling cycles is divided into equal amounts of data, wherein each of the speed grades has a respective bandwidth allocation associated with a respective length of time, wherein the length of time is one of the scheduling cycles for the bandwidth allocation for the highest speed grade, wherein the length of time is more than one of the scheduling cycles for each bandwidth allocation for the lower speed grades, wherein the lower speed grades and the highest speed grade are serviced by the node.

2. The apparatus of claim 1, wherein the length of time for the bandwidth allocation for the highest speed grade is determined with a counting modulo comprising the minimum integer derived from B divided by X, wherein B is said switching or routing capacity of the networking node and X is the highest amount of allocated bandwidth.

3. The apparatus of claim 1, wherein the length of time for each respective bandwidth allocation for the lower speed grades is determined with a counting modulo comprising k timess $x_{n-1}$, wherein k is how many lower speed grade bandwidth allocations can be provided by a next highest speed grade, and wherein $x_{n-1}$ is a counting modulo for a next highest speed grade.

4. The apparatus of claim 1, wherein the network node allocates bandwidth to one or more ports on a port-by-port basis, each of the ports having one or more queues for queueing packet identifiers that point to where a corresponding packet is found within a memory.

5. The apparatus of claim 4, wherein the network node can be configured such that one port exists for each user being serviced by the network node.

6. The apparatus of claim 4, wherein the network node further comprises a scheduler that provides release signals to the one or more ports at rates in accordance with the respective lengths of time for the respective bandwidth allocations for the highest speed grade and the lower speed grades, in order to trigger a releases of data from the memory, the releases from the memory in the form of packets pointed to by those of the packet identifiers stored within the one or more ports that receives the release signals.

7. The apparatus of claim 6, wherein the network node further comprises a second memory that can be configured to maintain a separate data entry for each of the one or more ports, each of the data entries identifying its corresponding port so that a release signal to be received by the corresponding port can be generated by reading its data entry from the second memory.

8. The apparatus of claim 7, wherein those data entries for each of the one or more ports having the same data rate are circularly link listed so that release signals to ports having a same associated speed grade are generated in a circular fashion.

9. The apparatus of claim 8, wherein each of the data entries further comprises space reserved for at least a bit of information that marks whether or not the data entry is to be recognized as an end of the circular link list to which it belongs.

10. The apparatus of claim 6, wherein the scheduler is implemented with application specific logic.

11. The apparatus of claim 6, wherein the scheduler is implemented with a processor that executes a software program.

12. A method for allocating bandwidth, comprising:

identifying a highest speed grade for a highest amount of allocated bandwidth;

identifying lower speed grades for speeds that are less than the highest amount of allocated bandwidth;

dividing each of the scheduling cycles into equal amounts of data;

providing each of the speed grades with a respective bandwidth allocation associated with a respective length of time.

wherein each bandwidth allotment is provided one of the amounts of data per unit of time, wherein the length of time is one of the scheduling cycles for the bandwidth allocation for the highest speed grade, wherein the length of time is more than one of the scheduling cycles for each bandwidth allocation for the lower speed grades; wherein the lower speed grades and the highest speed grade are serviced.

13. The method of claim 12, wherein the length of time for the bandwidth allocation for the highest speed grade is determined with a counting modulo comprising the minimum integer from B divided by X wherein B is switching or routing capacity of a network node and X is the highest amount of allocated bandwidth.

14. The method of claim 12, wherein the length of time for each respective bandwidth allocation for the lower speed grades is determined with a counting modulo comprising K times $X_{n-1}$, wherein k is how many lower speed grade bandwidth allocations can be provided by a next highest speed grade, and wherein $x_{n-1}$ is a counting module for a next highest speed grade.

15. The method of claim 12, further comprising allocating said bandwidth to one or more ports on a port-by-port basis by providing release signals to the one or more ports at rates in accordance with the respective lengths of time for the respective bandwidth allocations for the highest speed grades and the lower speed grades, each of the ports having one or more queues for queueing packet identifiers that point to where a corresponding packet is found within a memory.

16. The method of claim 15, further comprising triggering a release of data from the memory, the release from the memory in the form of packets pointed to by those of the packet identifiers stored within a port that receives a release signal.

17. The method of claim 15, further comprising configuring a networking system such that one port exists for each user being serviced by the networking system.

18. The method of claim 15, further comprising reading a data entry from a second memory, the second memory configured to maintain a separate data entry for each of the one or more ports, each of the data entries identifying its corresponding port so that a release signal to be received by the corresponding port can be generated by the reading.

19. The method of claim 18, further comprising generating release signals to ports having a same associated speed grade in a circular fashion, wherein data entries for each of the one or more ports having a same data rate are circularly link listed so that the circular generation of release signals results.

20. A network node, comprising:

one or more ports that each comprise one or more queues for queueing packet identifiers, each of said packet identifiers indicating where a packet can be found in a buffer memory, each of the one or more ports having its own data rate so that a plurality of data rates can exist, wherein each of a series of scheduling cycles is partitioned into equal amounts of data, wherein one of the amounts of data per scheduling cycle corresponds to a highest data rate of the plurality of data rates, wherein each of the one or more ports triggers a release from the buffer memory of one of the amounts of data worth of its identified packets in response to reception of a release signal derived from the series of scheduling cycles, and wherein releases from a same port are separated in time so that a data rate of that same port is realized.

21. The network node of claim 20, further comprising a second memory that can be configured to maintain a separate data entry for each of the one or more ports, each of the data entries identifying its corresponding port so that a release signal to be received by the corresponding port can be generated by reading its data entry from the second memory.

22. The network node of claim 21, wherein those data entries for each of the one or more ports having the same data rate are circularly link listed so that release signals for a particular speed grade are generated in a circular fashion.

23. The network node of claim 22, wherein each of the separate data entries further comprises at least a bit of information that marks whether or not the data entry is to be recognized as an end of the circular link list to which the data entry belongs.

24. The network node of claim 21, further comprising a scheduler that generates release signals by reading of data entries from the second memory, the scheduler coupled to each of the one or more ports so that the release signals can be issued to the one or more ports.

25. The network node of claim 24, wherein the scheduler is implemented with application specific logic.

26. The network node of claim 24, wherein the scheduler comprises a processor that executes a software program.

27. The network node of claim 20, wherein the one or more ports are allocated to respective users that are serviced by a networking system.

28. The network node of claim 27, wherein the one or more ports and the buffer memory are part of a networking/transport layer within the networking system that can
   1) identify which user an incoming packet is to be sent to; and
   2) enter a packet identifier into a port that has been allocated to the user the incoming packet is to be sent to, the packet identifier identifying where in the buffer memory the incoming packet can be found.

29. The network node of claim 28, wherein the networking/transport layer further comprises application specific logic that performs the identifying and the entering.

30. The network node of claim 29, wherein the application specific logic further comprises a packet processing pipeline that performs the identifying and the entering.

31. The network node of claim 28, wherein the networking/transport layer further comprises a processor that performs the identifying and the entering via execution of a software program.

32. A method for executing a scheduling cycle, comprising:
   distributing to each of one or more highest speed grade ports, while counting, permission to release one of equal amounts of data; and
   distributing to each of one or more lower speed grade ports, while continuing the counting, permission to release one of the equal amounts of data until the counting has counted across a counting modulo, wherein each of the lower speed grade ports consumes less bandwidth than each of the one or more highest speed grade ports, the counting modulo establishing a temporal width of the scheduling cycle that results in one of the equal amounts of data per scheduling cycle being the amount of bandwidth allocated to each of the one or more highest speed grade ports.

33. The method of claim 32, further comprising recognizing a highest speed grade as an active speed grade prior to distributing to each of the one or more highest speed grade ports permission to release the one of equal amounts of data.

34. The method of claims 33, further comprising, in response to recognizing the highest speed grade as the active speed grade, reading from a memory each data entry within a circular link list, each of the one or more highest speed grade ports represented by one of the data entries within the circular link list, wherein each one of the data entries has a value used to generate a permission to a particular highest speed grade port that the data entry represents.

35. The method of claim 34, wherein one of the data entries has a second value that indicates that the data entry is the last data entry in the circular link list, wherein reading of the last data entry causing a next lower speed grade to be recognized as the active speed grade.

36. The method of claim 35, wherein the counting module is a minimum integer derived from B divided by X, wherein B is a switching capacity of a networking system that executes the scheduling cycle and X is the amount of bandwidth allocated to each of the one or more highest speed grade ports; wherein counting across the counting module causes the highest speed grade to be recognized as the active speed grade for a beginning of a next scheduling cycle.

37. The method of claim 32, further comprising recognizing a particular lower speed grade as an active speed grade prior to the distributing to each of one or more lower speed grade ports permission to release one of the equal amounts of data.

38. The method of claim 37, further comprising, in response to recognizing a particular lower speed grade as the active speed grade, reading from a memory each data entry within a circular link list, wherein each of the lower speed grade ports that is allocated bandwidth at said particular lower speed grade is represented by one of the data entries within the circular link list, wherein each one of the data entries has a value used to generate a permission to the specific lower speed grade port that the data entry represents.

39. The method of claim 38, wherein one of the data entries has a second value that indicates the data entry is a last data entry in the circular link list, wherein reading of the last data entry causing a next lower speed grade to be recognized as the active speed grade.

40. The method of claim 39, further comprising keeping track of a different counting modulo for each lower speed grade, wherein a lower speed grade counting modulo for a particular lower speed grade bandwidth allocation is k times $X_{n-1}$, wherein k is a number of particular lower speed grade bandwidth allocations that can be provided by a next highest speed grade, and wherein $X_{n-1}$ is a counting modulo for a next highest speed grade.

41. A method for scheduling in a network node, comprising:
   (a) setting an active speed grade to a highest speed grade;
   (b) servicing as much as possible of a servicing circle of the active speed grade until a count for the highest speed grade has timed out;
   (c) if the servicing circle of the active speed grade has been fully serviced and the count for the highest speed grade has not timed out, then setting the active speed grade to a lower speed grade that is a highest speed grade having a servicing circle that has not been fully serviced and going to operation (b) and repeating;

(d) if the count for the highest speed grade has timed out, then setting the active speed grade to the highest speed grade that has not timed out and going to operation (b) and repeating.

42. The method of claim 41, wherein the servicing circle comprises a plurality of ports of the network node.

43. The method of claim 41, wherein the servicing circle is represented as a linked list in a memory of the network node.

44. The method of claim 41, wherein servicing as much as possible of a servicing circle of the active speed grade until a count for the highest speed grade has timed out comprises releasing packets one-by-one identified by a linked list of the servicing circle until the count for the highest speed grade has timed out.

* * * * *